(12) United States Patent
Nagayoshi

(10) Patent No.: US 6,585,372 B1
(45) Date of Patent: Jul. 1, 2003

(54) LINK STRUCTURE BETWEEN A TEMPLE ARM AND A BRACKET FOR EYEGLASSES

(76) Inventor: Koji Nagayoshi, 301, 18-5-7, Nakaarai, Fukui-shi, Fukui-ken 918-8151 (JP)

( * ) Notice: Subject to any disclaimer, the term of this patent is extended or adjusted under 35 U.S.C. 154(b) by 0 days.

(21) Appl. No.: 10/118,174

(22) Filed: Apr. 8, 2002

(51) Int. Cl.[7] .................................................. G02C 5/16
(52) U.S. Cl. ........................ 351/114; 351/121; 351/153; 16/228
(58) Field of Search ................................. 351/111, 113, 351/114, 116, 119, 120, 121, 153; 16/228

(56) References Cited

U.S. PATENT DOCUMENTS

| | | | | |
|---|---|---|---|---|
| 3,899,840 A | * | 8/1975 | Maillet | 351/113 |
| 4,780,928 A | * | 11/1988 | De Lorenzo Poz | 16/228 |
| 5,398,377 A | * | 3/1995 | Takiyama | 16/228 |
| 5,818,567 A | * | 10/1998 | Sakai | 351/113 |

FOREIGN PATENT DOCUMENTS

| | | |
|---|---|---|
| JP | 4-70624 | 6/1994 |
| JP | 09-133898 | 5/1997 |
| JP | 10-133153 | 5/1998 |

* cited by examiner

*Primary Examiner*—Huy Mai
(74) *Attorney, Agent, or Firm*—Flynn, Thiel, Boutell & Tanis, P.C.

(57) ABSTRACT

The object of this invention is to provide a link structure between a temple arm and a bracket capable of giving an appropriate resistance to the deploying and folding motion of the temple arm and of producing a characteristic variation of deploying and folding motion of the temple arm with the minimum number of parts and without screwing or soldering, to provide a link structure between a temple arm and a bracket presenting a visually simple and esthetic appearance to eyeglasses, and to provide eyeglasses having such a structure. To achieve these ends, a link structure between a temple arm and a bracket for eyeglasses wherein the temple arm comprises a link portion linking itself with the bracket, the bracket comprises link pieces on its inner upper and lower sides and a flexible member between the upper and lower link pieces, the link portion of the temple arm is inserted between the upper and lower link pieces of the bracket to fix rotatably therein, and the link portion of the temple arm and the flexible member are constantly kept in contact under pressure to each other is provided.

19 Claims, 26 Drawing Sheets

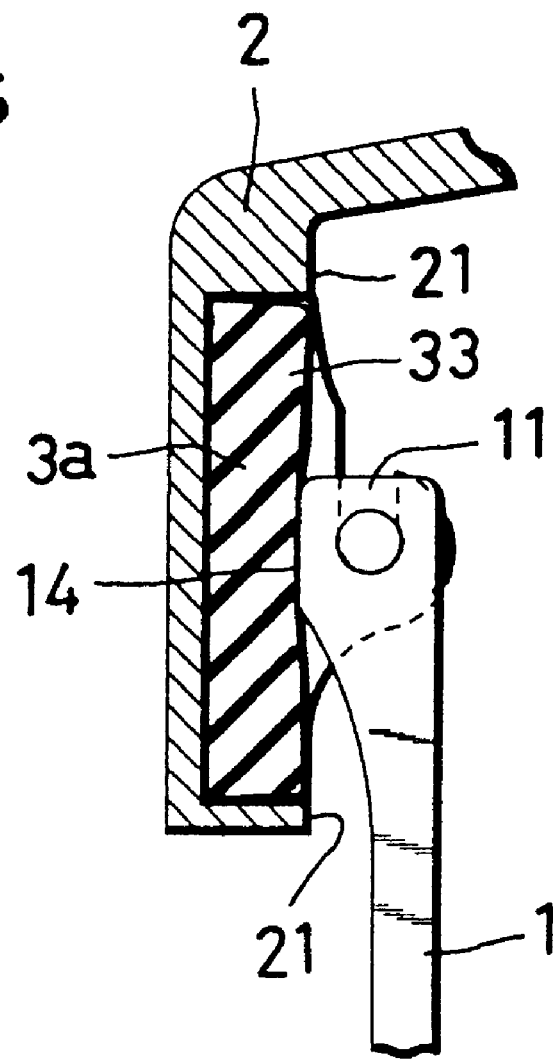

LINK STRUCTURE BETWEEN A TEMPLE ARM AND A BRACKET FOR EYEGLASSES

BACKGROUND OF THE INVENTION

1. Field of the Invention

The invention relates to a link structure between a temple arm and a bracket for eyeglasses, more particularly to a link structure between a temple arm and a bracket for eyeglasses presenting an adequate resistance to and producing a characteristic variation of mode of deploying and folding motion of the temple arm.

2. Description of the Related Art

Eyeglasses whose temple arms deploy and fold easily and naturally under the gravity give an impression of being a cheap product. Even if efforts are made to control the easiness of deployment of the temple arm by tightening the screw linking the temple arm and the bracket, the screw tends to become loose and return to the original state sooner or later. To give an impression of being a high-grade product to eyeglasses, a link structure between a temple arm and a bracket that does not allow any easy deployment and folding of the temple arm is necessary.

Therefore, a number of proposals have been made to create an appropriate resistance to the deploying and folding motion of the temple arm by developing a special link structure between the temple arm and the bracket.

However, the past proposals have in general been based on complicated constructions such as screwing or soldering a small spring to the temple arm or the bracket (see for example Japanese Patent Application Laid Open 1998-133153). And therefore, the manufacturing process became complicated, or the process of repairing the trouble or the replacement of parts was very difficult for users, and in fact many of them did not allow laymen to repair. Moreover, the past inventions included those whose link structure was naked and far from being fashionable (see for example Japanese Patent Application Laid Open 1997-133898) and those whose temple arms were unnaturally large (see for example Japanese Patent Application Laid Open 1992-70624), and thus they were not ones that give an impression of being a high-grade product.

To produce an impression of being a high-grade product, in the first place the eyeglasses must not be unshapely. This is perhaps a design issue, but considerations must be paid at least not leaving the link structure between the temple arm and the bracket in a naked state and not making the temple arm inordinately large. To achieve this end, the link structure must be simple. Conversely, a simple structure makes the whole product appear neat, and enables to simplify the manufacturing process and to reduce the chances for any troubles according to our experience. And it is to the advantage for users because it facilitates repairing any troubles and replacing parts.

Therefore, to sum up the issue, in order to give an impression of a high-grade product to eyeglasses, the link structure between the temple arm and the bracket is required to be of a simple construction without screwing or soldering and to be able to create an appropriate resistance (feeling of resistance) to the deployment and folding motion of the temple arms. And it will be better if the deployment and folding motion of the temple arm can be varied in strength constituting characteristic motions.

SUMMARY OF THE INVENTION

This invention was developed under the foregoing technical background and intended to overcome the foregoing issues.

In other words, an object of this invention is to provide a link structure between a temple arm and a bracket capable of giving an appropriate resistance to the deployment and folding motion of the temple arm with the minimum number possible of parts without screwing and soldering. Another object is to provide a link structure between a temple arm and a bracket capable of producing a characteristic variation of mode of deploying and folding motion of the temple arm in order to give an impression of being a high-quality product to eyeglasses. Further objects are to provide a link structure between a temple arm and a bracket of an apparently simple construction and giving an esthetic appearance to the eyeglasses and also to provide eyeglasses of such a construction.

The inventors of the application endeavored themselves to study the foregoing issues and have found that it is possible to give an adequate resistance to the deployment and folding motion of the temple arm by keeping constantly the link portion of the temple arm with the bracket in contact under pressure with a flexible member having a restoring force (a flexible member), to create a characteristic variation of mode of deploying and folding motion of the temple arm by forming the lateral surface of the link portion in various shapes, and to prevent the falling off of the flexible member by keeping the link portion of the temple arm in contact under pressure with the flexible member. And based on this finding, the inventors completed this invention.

That is, firstly, this invention resides in a link structure between a temple arm and a bracket for eyeglasses, the temple arm comprising a link portion linking itself with a bracket, the bracket comprising link pieces on its inner upper and lower parts and comprising further a flexible member between the upper and lower link pieces, wherein the link portion of the temple arm is inserted and fixed between the upper and lower link pieces, the temple arm and the bracket are rotatably linked and the link portion of the temple arm and the flexible members are constantly pressed together.

And secondly this invention resides in a link structure between a temple arm and a bracket for eyeglasses, the upper and lower surfaces of the link portion of the temple arm linking itself with the bracket respectively provided with a pivot protruding therefrom, the bracket being provided with link pieces on its inner upper and lower sides, respectively provided with an eyelet for the insertion of the pivot and provided further with a flexible member between the upper and lower link pieces, the eyelet for insertion being provided with a guide portion for guiding the pivot of the temple arm into the eyelet for the insertion of the pivot, wherein the link portion of the temple arm is inserted between the upper and lower link pieces of the bracket, the pivots on the upper and lower surfaces of the temple arm are inserted into the guiding portion of the eyelet for the insertion of a pivot formed on the upper and lower link pieces of the bracket and are fixed into the eyelet for the insertion of a pivot, the temple arm and the bracket are linked rotatably and the link portion of the temple arm and the flexible member are constantly pressed together.

And thirdly the eyelets for the insertion of the pivots of said upper and lower link pieces and the guide portion reside in a link structure between a temple arm and a bracket pierced through at least on either of the upper and lower link pieces.

And fourthly the eyelets for the insertion of the pivots of said upper and lower link pieces and the guide portion of said bracket reside in a link structure between a temple arm and a bracket that is hollow but bottomed on both upper and lower link pieces.

And fifthly this invention resides in a link structure between a temple arm and a bracket for eyeglasses in which the temple arm includes eyelets for allowing the penetration of the pivot in the link portion between the temple arm and the bracket, the bracket is provided with link pieces on its inner upper and lower sides, further provided with a flexible member between the upper band lower link pieces, the upper and lower link pieces are respectively provided with an eyelet for the insertion of a pivot, the link portion of the temple arm is inserted between the upper and lower link pieces of the bracket, the pivot is inserted and fixed rotatably so as to pierce through the eyelet for the insertion of the pivot of the upper and lower link pieces of the bracket and the eyelet for the insertion of the pivot of the link portion of the temple arm and is fixed solidly in the eyelet for the insertion of pivot in the upper and lower link pieces of the bracket, and thus the temple arm and the bracket are linked rotatably so that the link portion of the temple arm and the flexible member are constantly pressed together.

And sixthly said pivot resides in a link structure between a temple arm and a bracket consisting of a screw.

And seventhly said pivot resides in a link structure between a temple arm and a bracket that can be engaged in the eyelet for the insertion of the pivot of the upper and lower link pieces of the bracket.

And eighthly said eyelet for the insertion of the pivot of the link portion of the temple arm resides in a link structure between a temple arm and a bracket constituted by a pierced round eyelet.

And ninthly said eyelet for the insertion of the pivot of the link portion of the temple arm resides in a link structure between a temple arm and a bracket constituted by a depressed portion formed by the flexion of said link portion.

And tenthly this invention resides in a link structure between a temple arm and a bracket for eyeglasses in which the temple arm includes an eyelet for the insertion of pivot by bending the link portion linking itself with the bracket, the bracket is provided with link pieces on its inner upper and lower sides and further provided with a flexible member between the upper and lower link pieces, the upper and lower link pieces are linked by a pivot, the link portion of the temple arm is inserted between the upper and the lower link pieces of the bracket, the eyelet for the insertion of pivot of the link portion of the temple arm is hooked on the pivot linking the upper and lower link pieces of the bracket so that the pivot may be fixed rotatably, the temple arm and the bracket are linked rotatably and the link portion of the temple arm and the flexible member are constantly pressed together.

And in the eleventh place said flexible member resides in a link structure between a temple arm and a bracket engaged with a depressed portion formed on the inner side between the upper and lower link pieces of the bracket.

And in the twelfth place said flexible member resides in a link structure between a temple arm and a bracket engaged with a depressed portion with a support portion formed on the inner side between the upper and lower link pieces of the bracket.

And in the thirteenth place said flexible member resides in a link structure between a temple arm and a bracket integrally formed with the bracket.

And in the fourteenth place said link portion of the temple arm resides in a link structure between a temple arm and a bracket of which at least the surface in contact under pressure with the flexible member among its surfaces is formed by two rectangular surfaces.

And in the fifteenth place said link portion of the temple arm resides in a link structure between a temple arm and a bracket of which at least the surface in contact under pressure with the flexible member among its surfaces is formed by three or more rectangular surfaces more or less at right angles to each other.

And in the sixteenth place said link portion of the temple arm resides in a link structure between a temple arm and a bracket of which at least the surface in contact under pressure with the flexible member among its surfaces is formed by a curved surface.

And in the seventeenth place said link portion of the temple arm resides in a link structure between a temple arm and a bracket of which at least the surface in contact under pressure with the flexible member among its surfaces is formed by a cylindrical surface.

And in the eighteenth place said temple arm resides in a link structure between a temple arm and a bracket the outer surface of which is formed in an inwardly depressed shape.

And in the nineteenth place this invention resides in eyeglasses comprising a link structure between a temple arm and a bracket according to claims 1 through 18 above.

This invention can of course employ a structure comprising the combination of two or more aspects selected from the first to eighteenth aspects of the invention as long as it meets the object of the invention.

BRIEF DESCRIPTION OF THE DRAWINGS

FIG. 16 is a partial sectional view showing the state of linkup with a temple arm when a rubber-like substance is used for the flexible component.

PREFERRED EMBODIMENT OF THE INVENTION

Preferred embodiments (best modes of application) of link structure between the temple arm and the bracket according to this invention are described hereinafter with reference to drawings.

Figure 1:
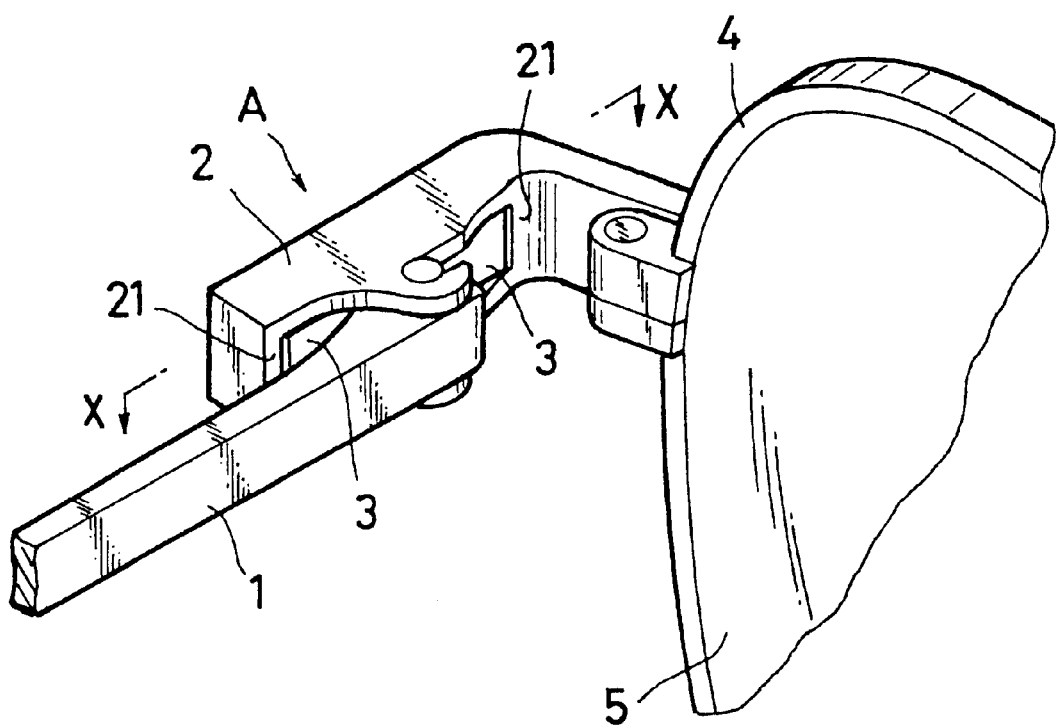
FIG. 1 is a perspective view showing an example of link structure between a temple arm and a bracket.
Figure 2:
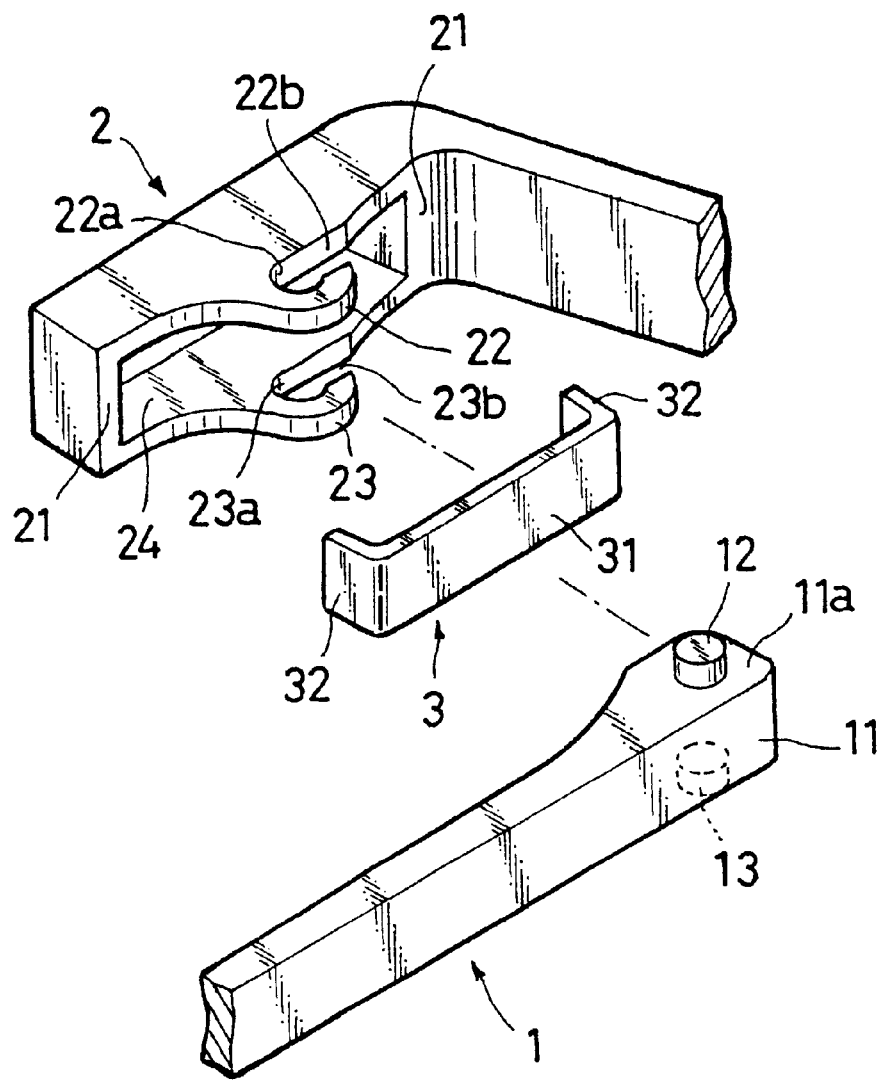
FIG. 2 is an exploded view showing separately each element of the link structure between a temple arm and a bracket illustrated in FIG. 1.
Figure 3:
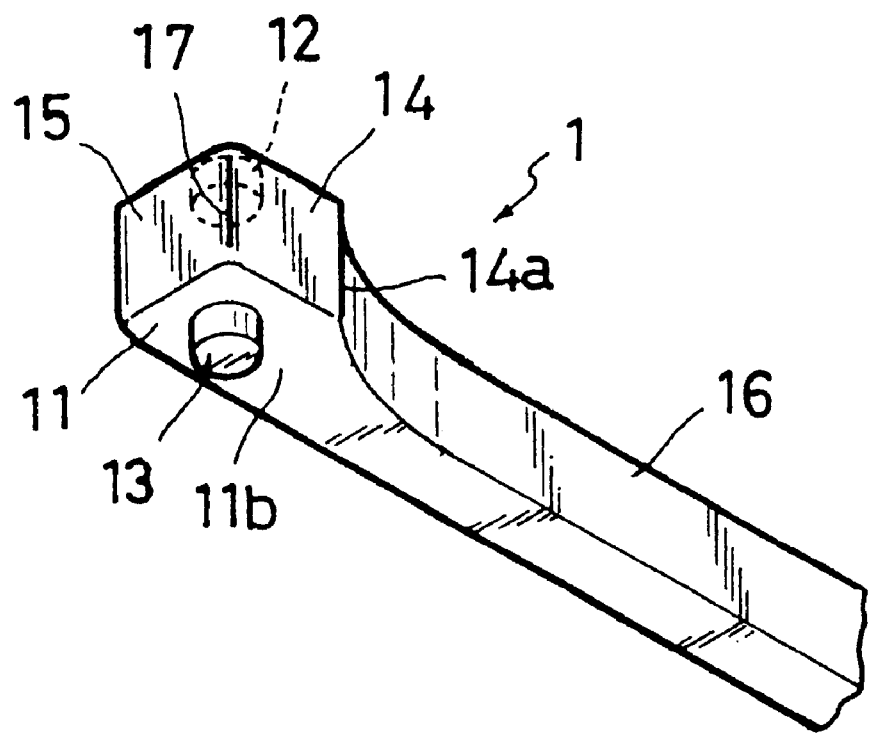
FIG. 3 is a view seen from the opposite side of the temple arm illustrated in FIG. 2.

First Embodiment: FIG. 1 is a view showing an example of construction of the link structure A between a temple arm and a bracket. FIG. 2 is an exploded view showing separately the elements of the link structure between a temple arm and a bracket illustrated in FIG. 1. And FIG. 3 is a view seen from the opposite side of the temple arm illustrated in FIG. 2.

In this way, the link structure A between a temple arm and a bracket according to this invention consists of three members, i.e. temple arm 1, bracket 2 and flexible member 3 as the basic elements. In the first place the shape of each element shall be described below.

A temple arm 1 includes a link portion 11 linking itself with a bracket 2. At the approximate center of the upper surface 11a and the lower surface 11b of the link portion 11, pivots 12 and 13 jut out cylindrically (see FIG. 2). These pivots 12 and 13 serve as the pivot for the rotation of the temple arm 1 and the bracket 2.

The link portion 11 of the temple arm 1 is in contact under pressure with a flexible member 3 at its lateral surface in a linked state (see FIG. 1). And in this example of construction, at least the portions pressed with the flexible member 3 among its surfaces are formed by two rectangular surfaces at approximately right angle to each other, i.e. the rectangular surface 14 and the rectangular surface 15 (see FIG. 3).

It is preferable that the outer surface 16 of the temple arm 1 would be formed in an inwardly depressed shape starting with the back end 14a of the rectangular surface 14. This is because, as stated below, the temple arm, if formed in this way, can deploy further outwardly, and users can obtain an adequate feeling of fit to the temple when the glasses are worn.

A bracket 2 (see FIG. 2) is provided with link pieces on the upper and lower sides of the inner side (hereinafter referred to as "the inner surface 21"), in other words with the upper link piece 22 on the upper side of the inner side and the lower link piece 23 on the lower side (hereinafter referred to as "the upper and lower link pieces 22 and 23"), and between the upper and lower link pieces 22 and 23 a depression 24 is formed.

The depression 24 is created in a longitudinally long rectangular shape.

The upper link piece 22 includes an eyelet for the insertion of a pivot 22a for fixing rotatably the pivot 12 of the temple arm 1, the eyelet piercing through the whole link piece. The eyelet for the insertion of a pivot 22a includes a guide portion 22b for guiding the pivot 12 of the temple arm 1 into the eyelet for the insertion of a pivot 22a, and it is open forward through this guide portion 22b.

Similarly, the lower link piece 23 includes an eyelet for the insertion of a pivot 23a (and guide portion 23b) for fixing rotatably the pivot 13 of the temple arm 1, the eyelet piercing through the whole link piece and being open forward.

The flexible member 3 consists of a flexible deformative portion 31 with flexible restorative force and two legs 32, 32. The legs 32, 32 are formed to flex outward respectively in relation to approximately right angle and to the flexible deformative portion 31.

The flexible member 3 is engaged with the rectangular depression 24 of the bracket 2 as shown in FIG. 1. If the flexible member 3 is formed so that it may engage in the depression 24, it does not jolt in the depression 24 and this is preferable. And if the flexible deformative portion 31 is, by its state of engagement, formed in such a way that it will be even with the inner surface 21 of the bracket 2, it will have a visually esthetic appearance and will be preferable.

Now, the shape of the bracket 2 will be discussed in more details.

Figure 4:
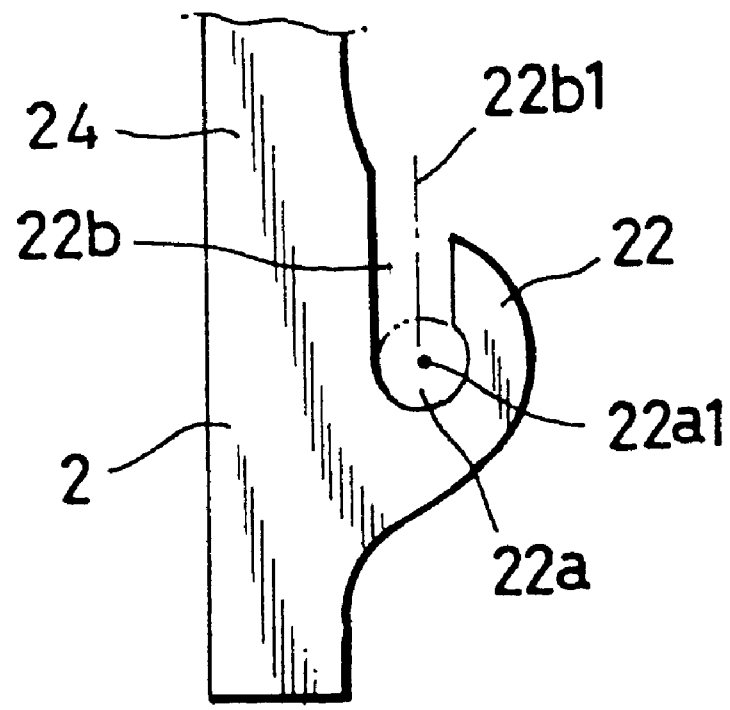
FIG. 4 is a plan view of the bracket as seen from above.

FIG. 4 is a plane view of the bracket as seen from the above. It is preferable, as shown in this example of construction, to form the bracket in such a way that the center 22a1 of the round eyelet for the insertion of pivot 22a may be somewhat inside of the center line 22b1 of the guide portion (represented by a chain line with one dot). This is because, if the bracket is formed in this way, as described later, the pivot 12 of the temple arm engages without fail with the eyelet for the insertion of pivot 22a when the temple arm is linked and the temple arm can hardly run off therefrom.

The eyelet for the insertion of a pivot 23a and others for the lower link piece 23 is also formed in the same way.

Then, the linkup of the aforementioned members will be discussed.

Figure 5:
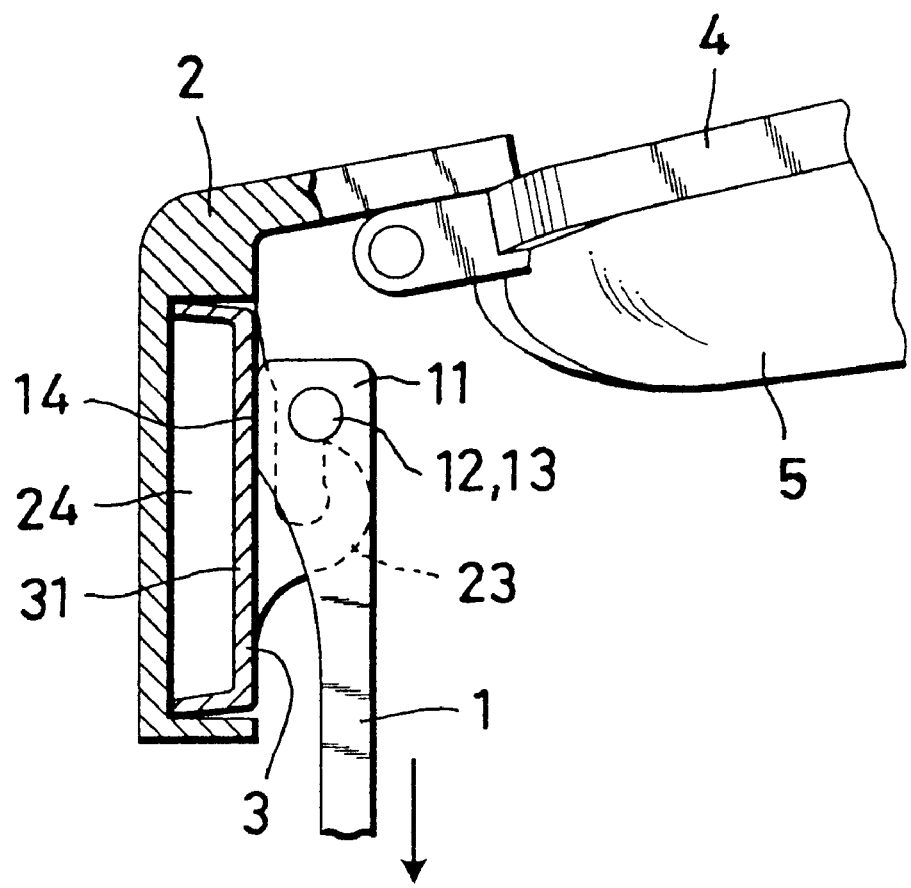
FIG. 5 is a partial sectional view showing the process of linking a temple arm with a bracket in the depressed portion of which a flexible member is engaged and shows the state before the linkup.
Figure 6:
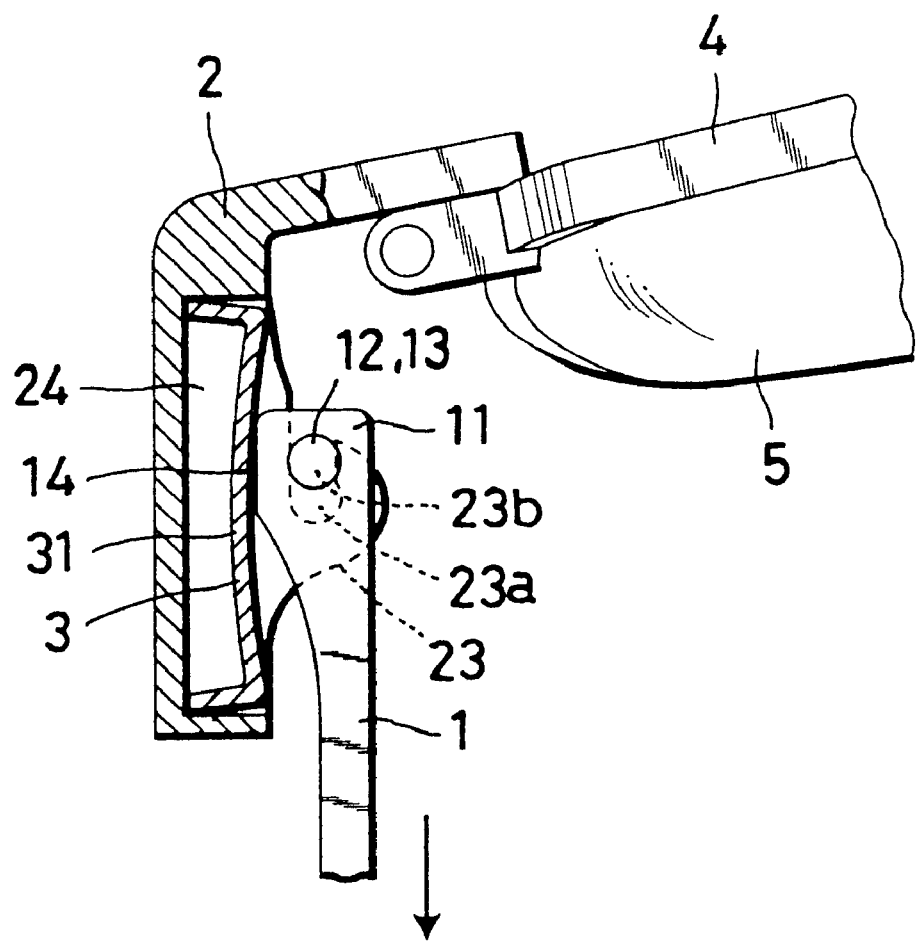
FIG. 6 is a partial sectional view showing the process of linking a temple arm with a bracket in the depressed portion of which a flexible member is engaged and shows the state during the linkup.
Figure 7:
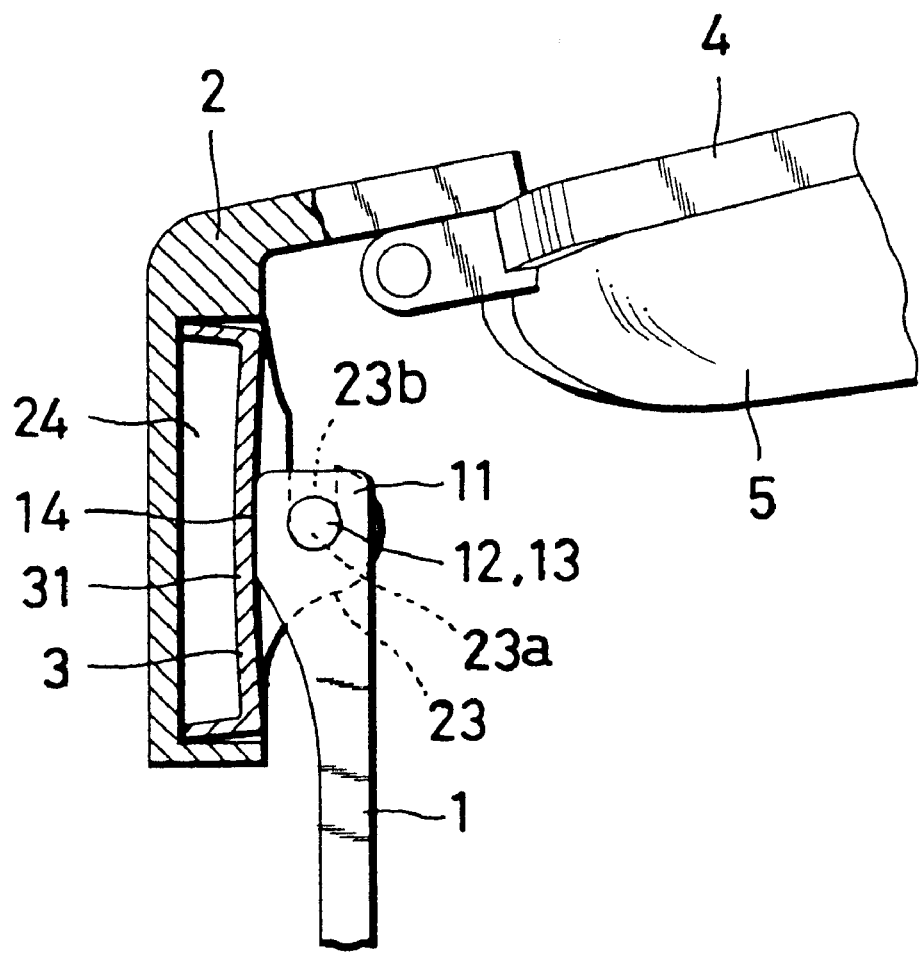
FIG. 7 is a partial sectional view showing the process of linking a temple arm with a bracket in the depressed portion of which a flexible member is engaged and shows the state after the linkup.

FIGS. 5–7 are partial sectional views showing the process of linking a temple arm to a bracket in the depression of which a flexible member is engaged with. FIG. 5 showing the state before the linkup, FIG. 6 showing the state during the linkup and FIG. 7 showing the state after the linkup. To facilitate understanding of the readers, FIGS. 5–7 show most of the bracket 2 and the flexible member 3 in the form of sectional views along the line X—X of FIG. 1, and show the temple arm 1 in a form of plane view as seen from the above. For this reason, only the lower link piece 23 of the bracket 2 is shown, but the discussions will be made based on the assumption that the upper link piece 22 exists on the upper side of the temple arm 1.

In the first place, before a temple arm 1 and a bracket 2 are to be linked, a flexible member 3 should be engaged with the depression 24 of a bracket 2.

Then, the link portion 11 of the temple arm 1 should be inserted between the upper and lower link pieces 22 and 23 of the bracket 2 so that the pivots 12 and 13 of the temple arm 1 may come before the upper and lower link pieces 22 and 23 (see FIG. 5). And the temple arm 1 should be pulled backward while the flexible deformative portion 31 of the flexible member 3 is pushed with the rectangular surface 14 of the link portion 11 of the temple arm 1 into the depression 24 of the bracket 2, and the pivots 12 and 13 of the temple arm 1 should be inserted into the guide portion 22b and 23b of the upper and lower link pieces 22 and 23 (see FIG. 6). When the temple arm 1 is pulled further backward, the pivots 12 and 13 of the temple arm 1 will engage with the eyelets for the insertion of pivots 22a and 23a and will be fixed rotatably there (see FIG. 7 and FIG. 1 which is a perspective view illustrating this state).

If, as shown in FIG. 4, the eyelets for the insertion of pivot 22a and 23a are located somewhat inside the guide portions 22b and 23b, due to the restoring force of the flexible deformative portion 31 of the flexible member 3, the pivots 12 and 13 engage without fail in the eyelets for the insertion of pivot 22a and 23a. And since the pivots are always forced into the eyelets for the insertion of pivot due to the flexible restoring force of the flexible member 3, the temple arm can hardly run off from the bracket.

Figure 8:
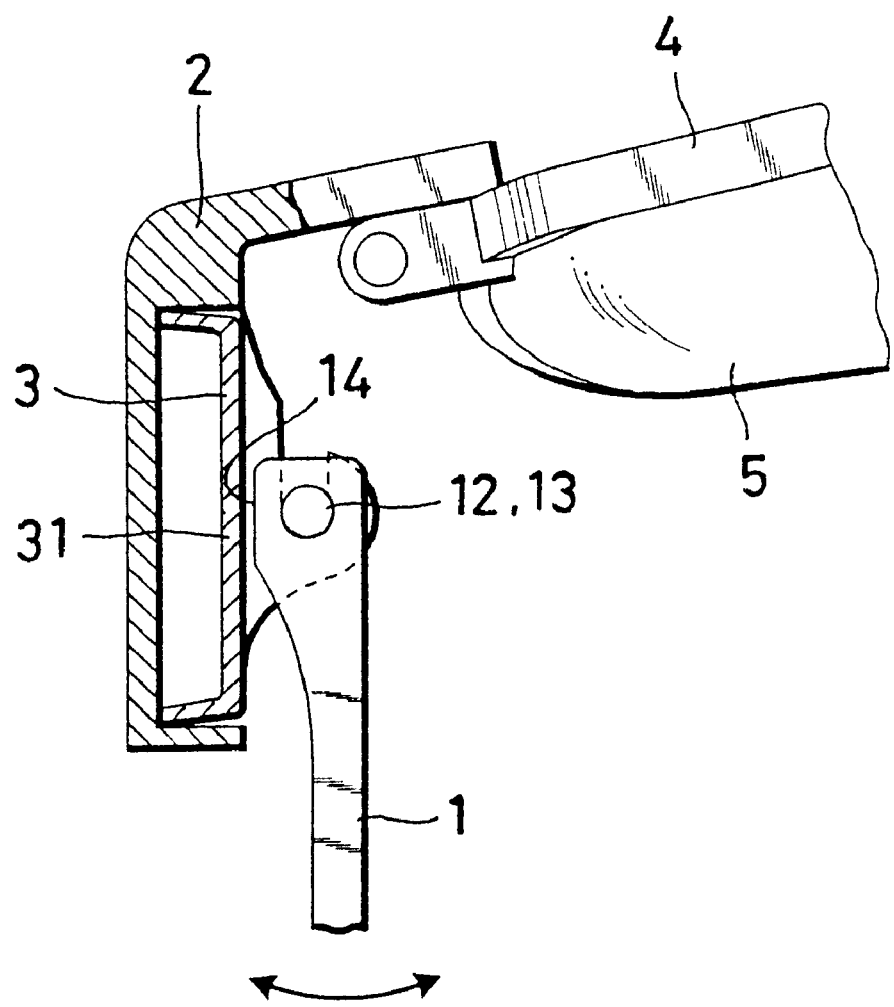
FIG. 8 is a view showing the state of separation between the rectangular surface of the temple arm and the flexible deformative portion of the flexible member.

And, if the position of the eyelets for the insertion of pivot 22a and 23a and that of the flexible deformative portion 31 of the flexible member 3 are too separated, even if the temple arms and the link pieces of the brackets are linked as shown in FIG. 8, the rectangular surface 14 of the temple arm 1 and the flexible deformative portion 31 of the flexible member 3 will be separated. And therefore, the temple arm 1 tends to rotate freely in the direction shown by the arrow in the figure and tends to be rickety. And the flexible member 3, no longer under the control of the temple arm 1, may in the worst case fall off from the depression 24 of the bracket 2.

In order to prevent such an eventuality, it is necessary in the linkup state (see FIG. 7) to keep the rectangular surface 14 of the temple arm in contact with the flexible deformative portion 31 of the flexible member with an adequate pressure. And for that purpose, the eyelets for the insertion of pivot 22a and 23a (and if necessary the flexible member) must be formed in such a way that such a state of contact under pressure may be realized.

Conversely speaking, the linkup of the temple arm and the flexible member in a state of contact under an adequate pressure is the most important characteristic of this invention. And in this invention, this linkup state by contact under pressure is constantly maintained even during the deployment and folding motion of the temple arm as mentioned below.

Then, the possibility of maintaining the linkup state by contact under pressure even during the deployment and folding motion of the temple arm, of creating an adequate resistance to the deployment and folding motion of the temple arm, and of creating a characteristic deployment and folding motion of the temple arm with different levels of resistance thereto according to this invention will be discussed.

The case of rotating the temple arm linked as shown in FIG. 7 and folding it towards the lens will be considered. In this case, the pivots 12 and 13 will be the pivots for rotation of the temple arm 1 in relation to the bracket 2.

Figure 9:
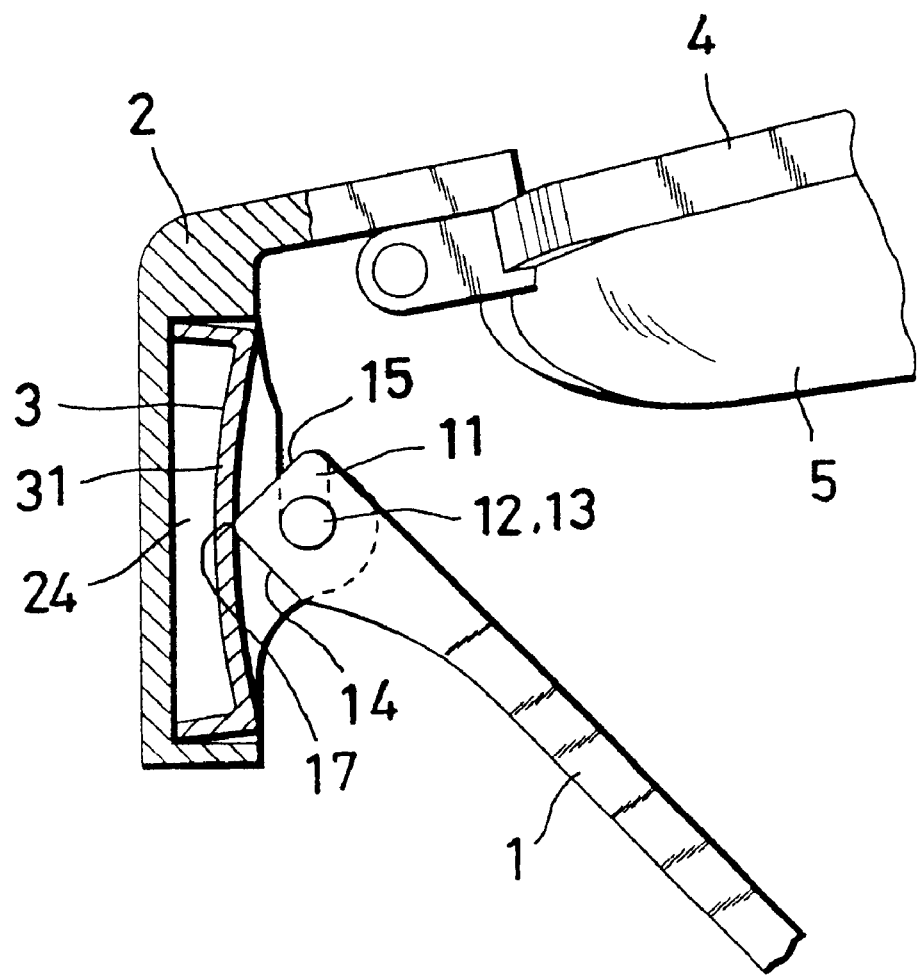
FIG. 9 is a view showing the state during the rotation of the temple arm.

FIG. 9 shows the state of rotation of the temple arm. In this state, the ridgeline portion 17 (the angle is beveled in this construction example) formed by the rectangular surface 14 and the rectangular surface 15 of the link portion 11 of the temple arm 1 is in contact under pressure with the flexible deformative portion 31 of the flexible member 3. And since the flexible deformative portion 31 is pressed more deeply into the depression 24 of the bracket 2 in comparison with the state of pressurized contact of the rectangular surface 14 (see FIG. 7), the link portion 11 of the temple arm 1 is subjected to a stronger restoring force from the flexible member 3.

In other words, while the temple arm 1 moves from the state shown in FIG. 7 (the deployed state) to the state shown in FIG. 9 (the intermediate state), the resistance to rotation gradually increases.

Figure 10:
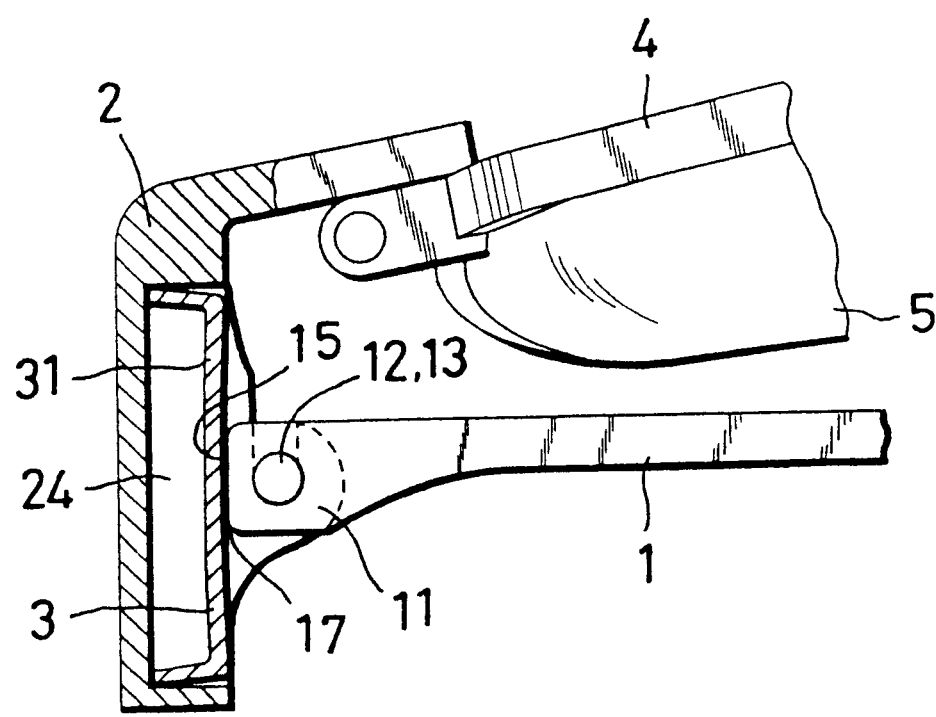
FIG. 10 is a view showing the completely folded state of the temple arm towards the lens.

Then, the state of the temple arm being completely folded towards the lens by a further rotation of the temple arm is shown in FIG. 10. In this state, the rectangular surface 15 of the link portion 11 of the temple arm 1 is in contact under pressure with the flexible deformative portion 31 of the flexible member 3. However, the flexion of the flexible deformative portion 31 of the flexible member 3 is smaller than the state shown in FIG. 9. In other words, during the process of change from FIG. 9 to FIG. 10, rotation either occurs automatically or rotation is at least accelerated due to the flexible restoring force of the flexible member 3.

Thus, in this construction example, it is necessary to push and rotate the temple arm from the deployed state (see FIG. 7) until the intermediate state (see FIG. 9). After having passed a certain limit, however, the temple arm rotates rapidly with the support of the flexible restoring force of the flexible member, and settles naturally into the folded state (see FIG. 10).

And in this construction example, conversely, in the case of deploying the temple arm from the folded state to the deployed state, similarly characteristic motion can be realized. Specifically, from the folded state (see FIG. 10) until the intermediate state (see FIG. 9) the temple arm is rotated by pulling it backward. And after passing a certain limit, the temple arm rotates swiftly in the direction of deployment due to the restoring force of the flexible member and settles naturally in the deployed state (see FIG. 7).

Thus, by using the link structure between a temple arm and a bracket according to this invention, it is possible to create a characteristic variation in the mode of deploying and folding motion of the temple arm only by forming the link portion of the temple arm in a specific shape (in this case two rectangular surfaces at approximately right angle to each other). And it is needless to say that the linkup state in contact under pressure will be maintained during the deployment and folding motion of the temple arm. For this reason, it will be possible to give an appropriate resistance to the deploying and folding motion of the temple arm.

Thus, the link structure between a temple arm and a bracket according to this invention, although simple in its construction consisting of forming a depression in the bracket and engaging a flexible member therein, can give an appropriate resistance to the deployment and folding motion of the temple arm and to create a characteristic variation in the mode of deployment and folding motion thereof.

And since the temple arm and the flexible member are constantly in contact under pressure, it is possible to prevent them from falling off. Thus, no need of fixing the flexible member by screwing or soldering according to this invention can simplify the manufacturing process, reduces the possibility of developing mechanical failures, and enables the users to repair easily mechanical failures and to replace defective parts.

And the simplicity of construction produces a neat link structure free of useless parts as shown in FIG. 1. It should be noted here that the formation of the flexible deformative portion 31 of the flexible member and the inner surface 21 of the bracket in such a way that they may constitute an even surface would give a further neat appearance and impression, and this would be preferable.

Thus, the link structure between a temple arm and a bracket according to this invention is of a simple construction that produces no impression of unnaturalness in the link structure and therefore can give an impression of high-grade product to eyeglasses.

Lastly, the formation of the outer surface 16 of the temple arm in an inwardly depressed state from the back end 14a of the rectangular surface 14 as shown in FIG. 3 will be discussed.

Figure 11:
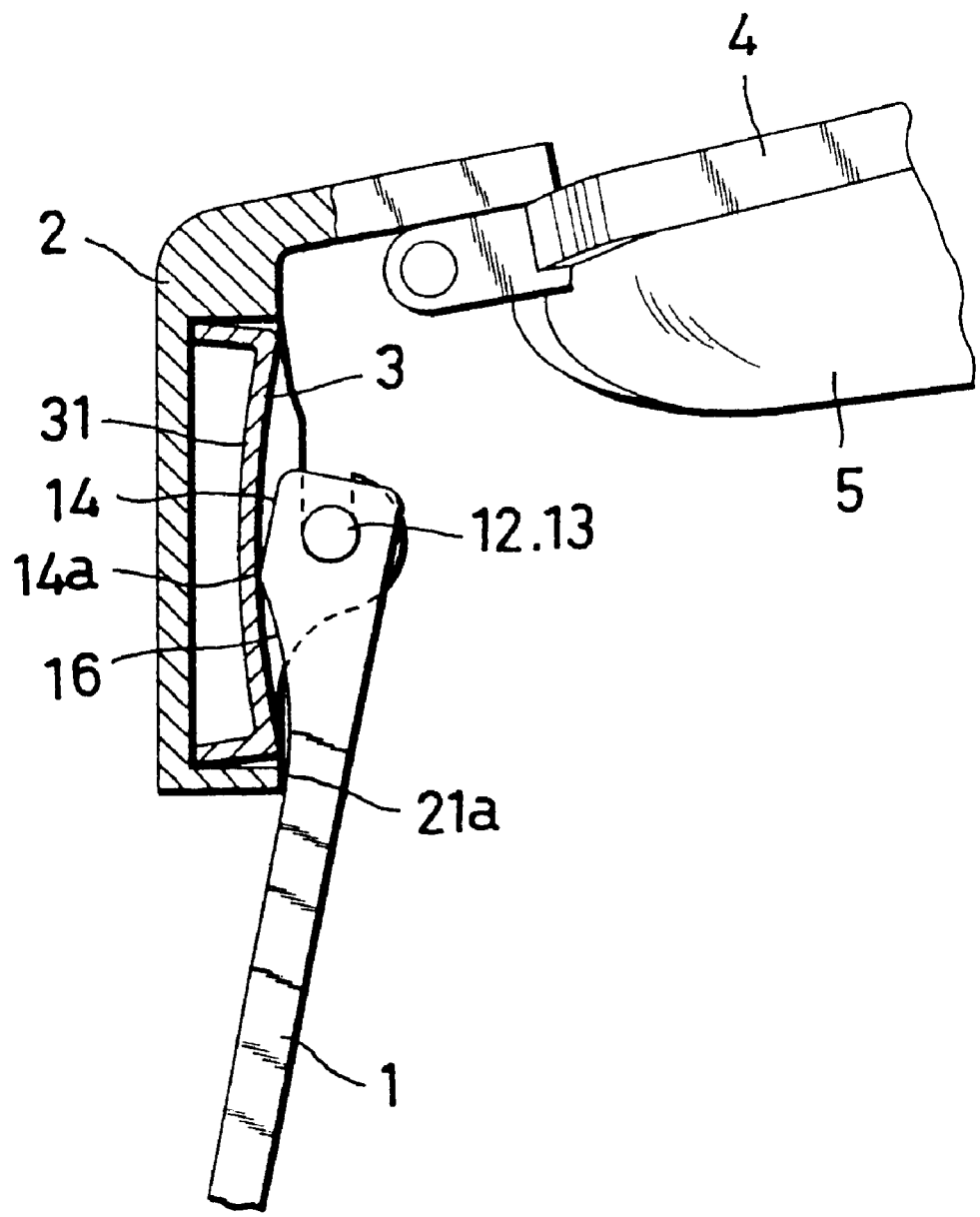
FIG. 11 is a view showing the deployed state of the temple arm further to the outside.

The temple arm linked with the bracket in the state shown in FIG. 7 will be in the state shown in FIG. 11 when a force for deploying further outward as in the case of wearing these eyeglasses. In other words, the temple arm 1 deploys outward until outside surface 16 of the temple arm 1 comes into contact with the top end 21a on the inside of the bracket 2 while the back end 14a of the rectangular surface 14 pushes outward the flexible deformative portion 31 of the flexible member 3 causing a flexible deformation. Since the flexible restoring force of the flexible deformative portion 31 of the flexible member applies on the temple arm 1 at this time, when the force to deploy the temple arm further outward is gone, the temple arm naturally returns to the state shown in FIG. 7.

In other words, as the outer surface of the temple arm takes the aforementioned shape, the temple arm can deploy further outward, and as the restoring force to the original state applies to the temple arm, an adequate feeling of fit in relation to the temple can be obtained when eyeglasses are worn.

In order to avoid repetition, no reference is made to the formation of the outer surface of the temple arm in an inwardly depressed state in various variations described below. However, such a formation is obviously possible and is illustrated as such.

[Variants of Link Pieces]

In the aforementioned preferred embodiment the eyelets for the insertion of pivot and the guide portions created in the upper and lower link pieces of the bracket were formed by piercing through the link pieces as shown in FIG. 2. However, it is possible to form the eyelet as a bottomed hollow portion not piercing through the link piece.

Figure 12:
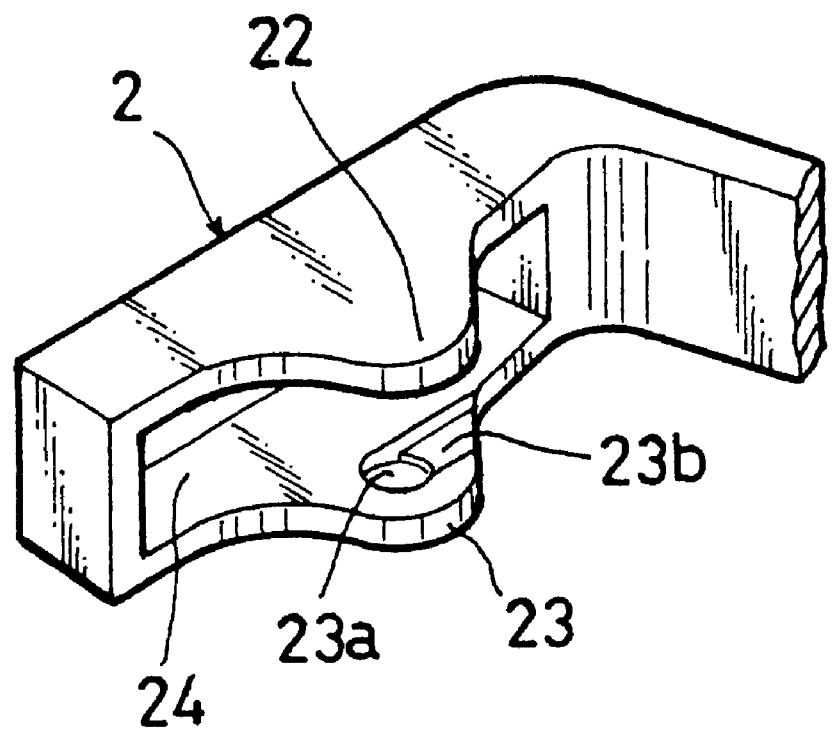
FIG. 12 is a view showing an example of eyelets for insertion and guide portions for pivots on the upper and lower link pieces formed as bottomed hollow portions.
Figure 13:
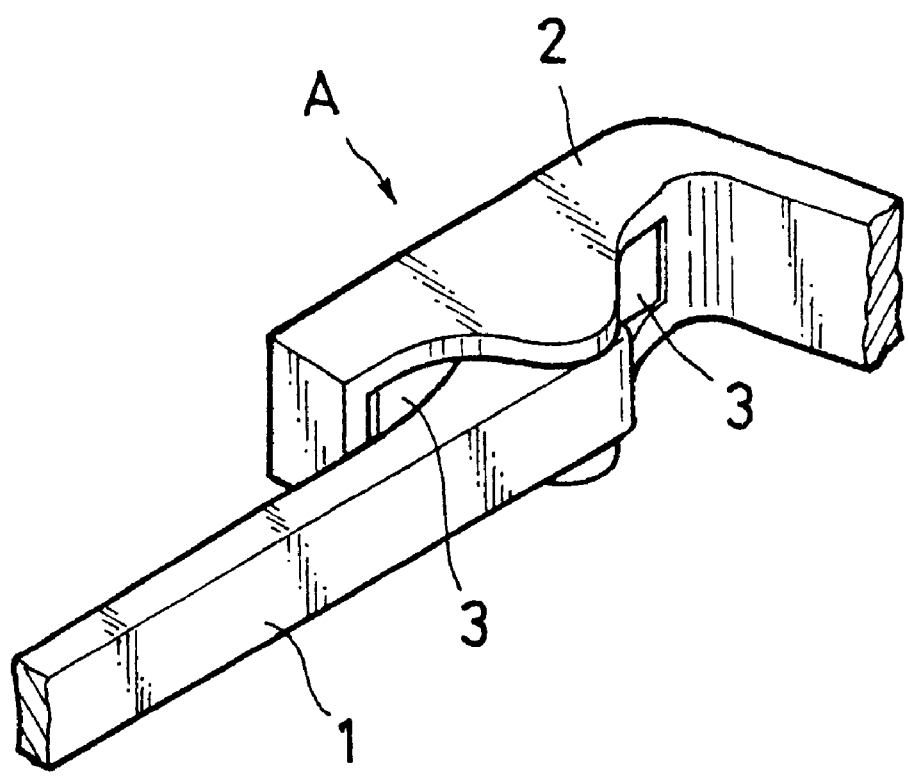
FIG. 13 is a view showing the linked state of a bracket formed as illustrated in FIG. 12 with a temple arm.

FIG. 12 shows an example of forming eyelets for the insertion of pivot and guide portions of the upper and lower link pieces as bottomed hollow portions. Thus, the formation of eyelets for the insertion of pivot 23a (and 22a) and guide portions 23b (and 22b) as bottomed hollow portions enables to avoid the exposure of the pivots of the temple arm when the temple arm is linked (see FIG. 13).

Incidentally, by making the eyelets for the insertion of pivot 23a (and 22a) somewhat deeper than the guide portions 23b (and 22b), it is possible to ensure that the pivots of the temple arm would engage with the eyelets for the insertion of pivot and to prevent the temple arms from falling off. And, as shown in this example, it is obviously possible to form the eyelets for the insertion of pivot on both the upper and lower link pieces bottomed hollow portions, and to form the eyelet on one link piece a hollow portion piercing through the link piece and to form the other as a bottomed hollow portion.

[Variants of the Flexible Member]

Figure 14A:
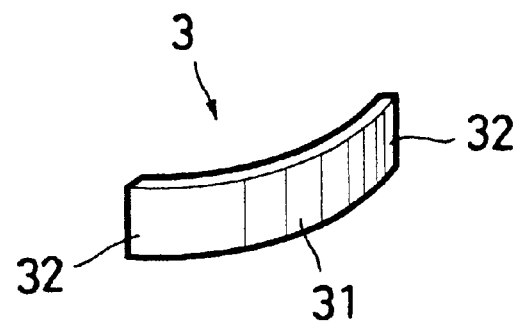
FIG. 14 is a view showing an arched flexible member and its linked state, where (A) shows the flexible member and (B) is a partial sectional view showing the state of its linkup with a temple arm.

Then, FIG. 2 shows an example of flexible member provided with a flexible deformative portion and two legs flexing outward approximately at the right angle thereto. However, it is possible to form the flexible member for example in an arched shape as shown in FIG. 14(A). In other words, the flexible deformative portion 31 and two legs 32 and 32 are linked together in an arched shape.

Figure 14B:
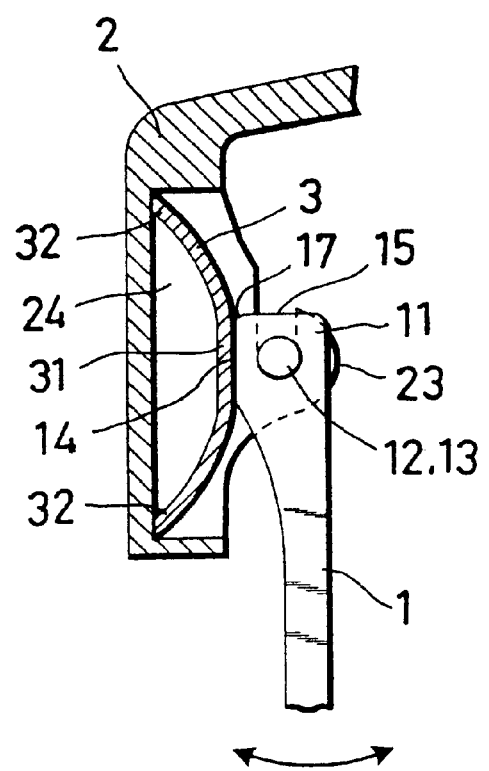

FIG. 14(B) is a partial sectional view showing the state of this flexible member 3 engaged with the depression of the bracket and the temple arm linked with the bracket. Under the state wherein the temple arm 1 is linked in this way, like the case of the aforementioned preferred embodiment, the rectangular surface 14 of the link portion 11 of the temple arm 1 is in contact under pressure with the flexible deformative portion 31 of the flexible member 3. And when the temple arm 1 rotates, the link portion 11 of the temple arm 1 and the flexible member 3 are constantly in contact under pressure as in the case of the aforementioned preferred embodiment. It should be noted, however, that because of the arched shape, the contact pressure tends to strong.

Figure 15A:
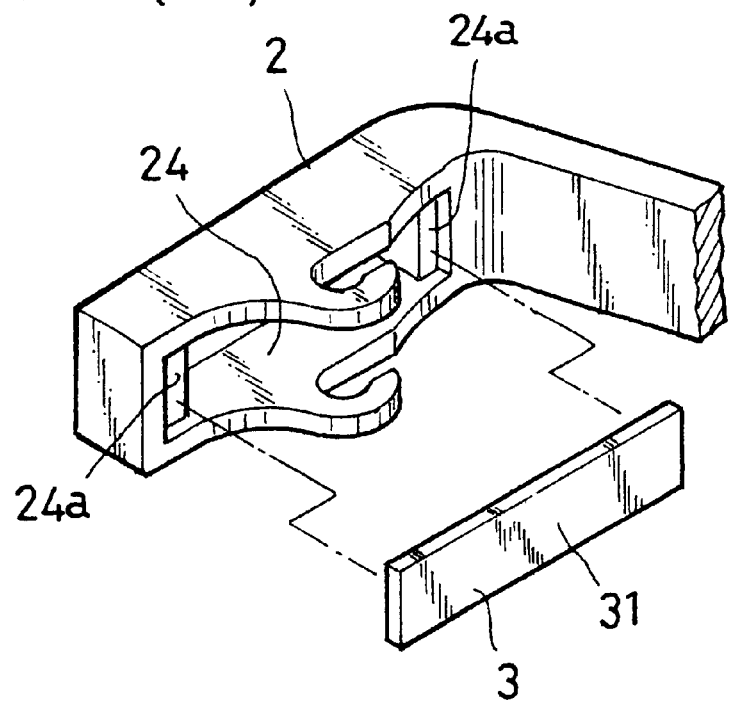
FIG. 15 is a view showing an example of bracket wherein a depression provided with a flexible member consisting only of a flexible deformative portion and support portions is formed, wherein (A) is a perspective illustration of the flexible member and the bracket, and (B) is a partial sectional view of the state of its linkup with a temple arm.
Figure 15B:
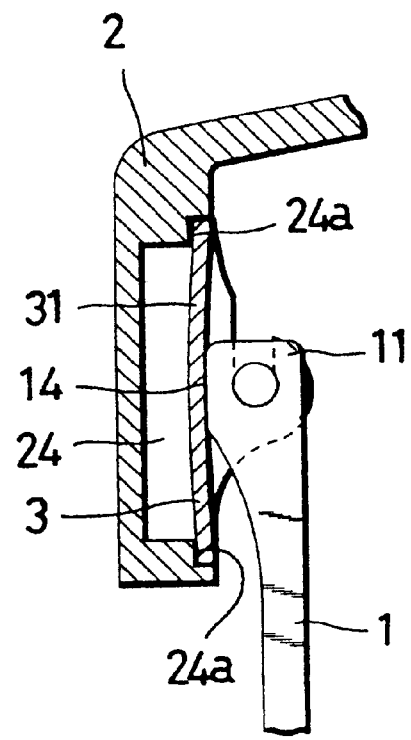

And it is also possible to limit the flexible member to a flexible deformative portion and to form supports corresponding to the legs of the flexible member in the depression of the bracket. FIG. 15 contain views showing an example of bracket comprising a depression containing a flexible member and supports of such shapes, wherein (A) is a perspective view of the flexible member and the bracket, and (B) is a partial sectional view showing the state of the temple arm being linked thereto.

The flexible member 3 consists only of a flat flexible deformative portion without legs 31, and the depression 24 of the bracket 2 is provided with supports 24a and 24a respectively with a bottom shallower than the depression 24 at the front and back ends. When a flexible member 3 is engaged therewith and the temple arm 1 is linked with the bracket (see FIG. 15(B)), the link portion 11 of the temple arm 1 and the flexible member 3 are put in a state of constant contact under pressure to each other like the case mentioned above.

On the other hand, it is possible to use a rubber-like substance that can be engaged with the whole depression of the bracket for the flexible member in place of a plate-shaped flexible member as mentioned above (FIGS. 2, 14 and 15) (see FIG. 16). In that case, when the temple arm 1 is linked, the contact surface 33 of the rubber-like substance 3a will be somewhat depressed after coming into contact with the rectangular surface 14 of the link portion 11 of the temple arm 1.

If the rubber-like substance 3a has an adequate flexibility of flexible restoring force (intensity of repulsion), it can display an effect equivalent to that of flexible members having the aforementioned flexible deformative portion. And if its contact surface 33 is formed in such way that it will be level with the inner surface 21 of the bracket 2, it will have a visually esthetic appearance and will be preferable. And by changing the type of material of the rubber-like substance, flexible restoring force can be changed.

Furthermore, instead of separating the flexible member (including the case of a rubber-like substance) and the bracket as mentioned above, the flexible member may be integrated with the bracket.

Figure 17:
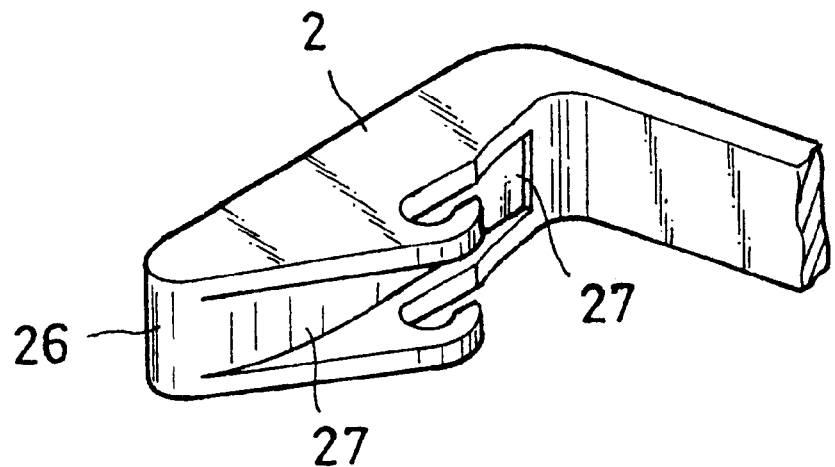
FIG. 17 is a view showing an example of a flexible member integrated with the bracket, wherein (A) is a perspective illustration and (B) is a sectional view.
Figure 17:
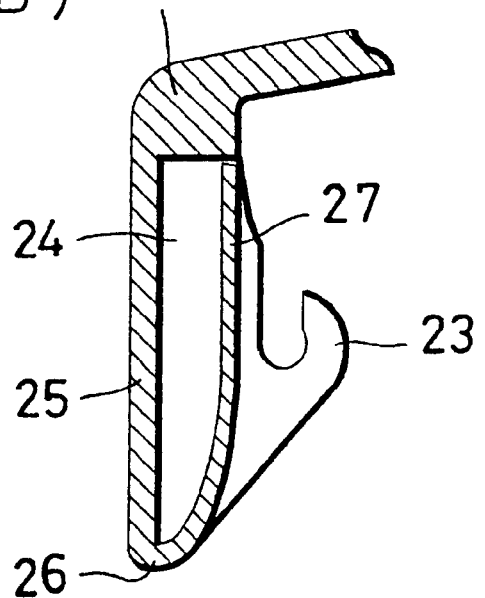

FIG. 17 includes views showing an example of integration of the flexible member and the bracket, where (A) is a perspective view and (B) is a sectional view. In this case, the flexible member is formed in such a way that the lateral surface 25 of the bracket forming the depression 24 of the bracket 2 would extend at its back end, bend and curve to constitute a flexible deformative portion 27. This construction example is advantageous in that it reduces the number of components by the integration of the flexible member and the bracket and that, by means of a temple arm and a bracket made in a special shape alone, the outstanding effect of the link structure between a temple arm and a bracket according to this invention can be obtained.

[Variants of the Link Portion of the Temple Arm]

As stated above, the link structure between a temple arm and a bracket according to this invention can produce a characteristic variation of mode of deploying and folding motion of the temple arm by forming the link portion of the temple arm in a special shape. In other words, by changing the shape of the link portion of the temple arm, it is possible to produce a characteristic variation of mode of deploying and folding motion of the temple arm.

FIG. 2 describes the case wherein at least the portion in contact under pressure with the flexible member among the lateral sides of the link portion of the temple arm consist of two rectangular surfaces at approximately right angle to each other. It is possible, however, to make the link portion of the temple arm come into pressurized contact with the flexible member in a still larger number of surfaces.

Figure 18:
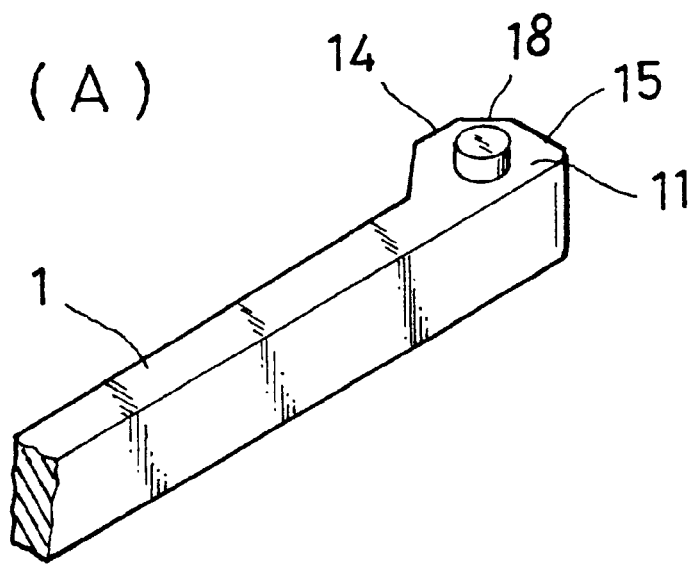
FIGS. 18(A) and 18(B) are views showing an example of construction of the link portion of a temple arm having three rectangular surfaces as the surface in contact under pressure with the flexible member.
Figure 18:
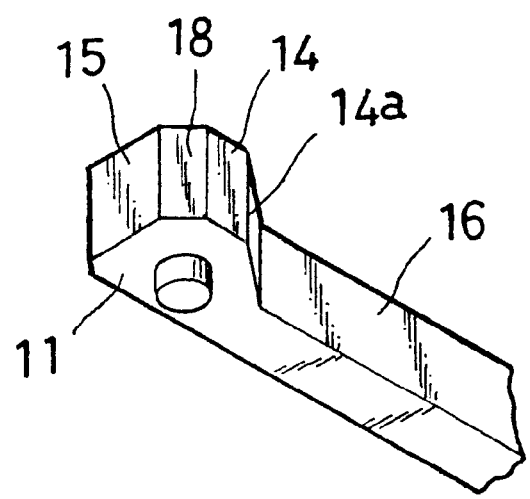

FIG. 18 is a view showing an example of construction of the link portion of a temple arm having three rectangular surfaces for the surfaces that come into contact under pressure with the flexible member [FIG. 18(B) is a view seen from the opposite side of FIG. 18(A)]. In this example, the link portion 11 of the temple arm 1 parted from the ridgeline 17 according to the aforementioned preferred embodiment shown in FIG. 3 and replaced it with a new rectangular surface 18.

Figure 19:
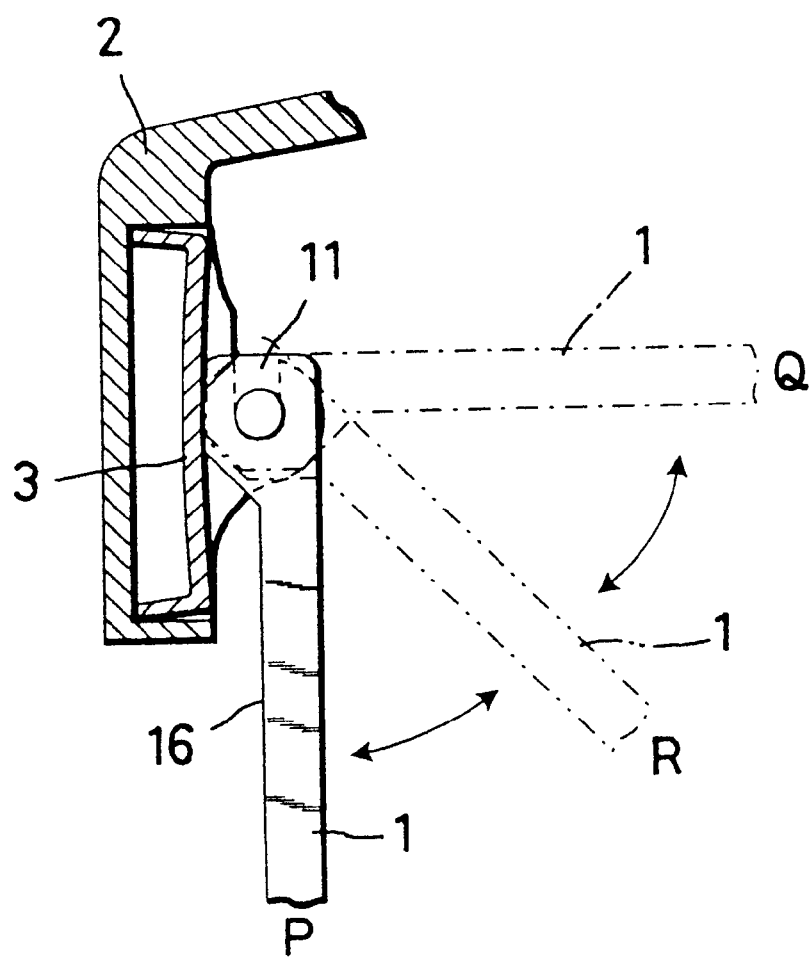
FIG. 19 is a view schematically showing the characteristic deploying and folding motion of a temple arm having a link portion shown in FIG. 18.

The characteristic motion during the deployment and folding of the temple arm in this case is schematically illustrated in FIG. 19. In this case, the state at the position P where the flexible member 3 and the rectangular surface 14 are in contact under pressure corresponds to the state shown in FIG. 7 as the preferred embodiment, and the state at the position Q where the flexible member 3 and the rectangular surface 15 are in contact under pressure corresponds to the case shown in FIG. 10.

In this example of construction, while the temple arm 1 moves in the direction of folding from the position P to the position Q, or in the direction of deployment from the position Q to the position P, it passes through the state wherein the rectangular surface 18 of the link portion 11 is in contact under pressure with the flexible member 3 (the position R shown in FIG. 19). Unlike the unstable state shown in FIG. 9, the temple arm 1 remaining at this position R is in a relatively stable state of tending to return naturally to the position R even if it is pushed to some extent, because the link portion and the flexible member are in contact face to face under pressure.

Therefore, when the temple arm 1 is for example moved in the direction of folding from the position P to the position Q, a push on the temple arm 1 remaining at the position P to start rotating causes the temple arm 1 to accelerate suddenly in its rotation from a certain point between the position P and the position R to settle for a moment at the position R. Another push on the temple arm 1 to start rotation causes a sudden acceleration in its rotation after reaching a certain point to finally settle at the position Q resulting in a characteristic and phased motion.

Figure 20:
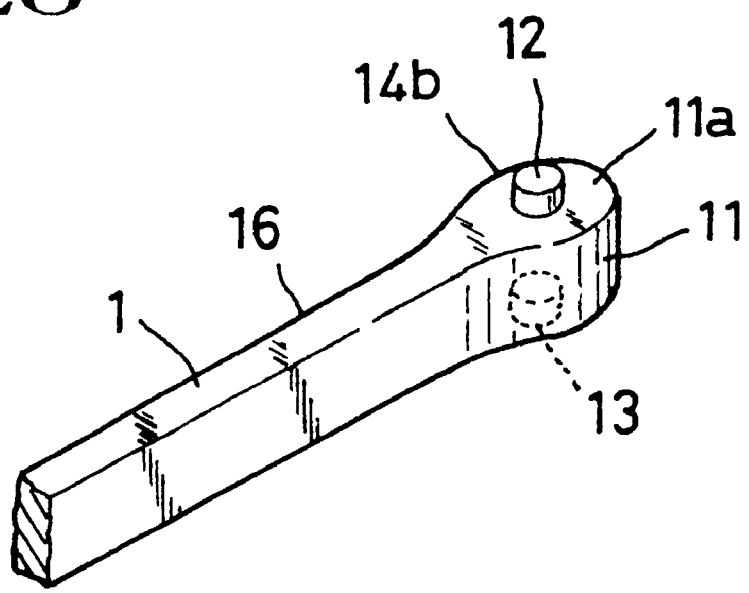
FIG. 20 is a view showing an example of construction of the link portion of a temple arm the lateral surface of which is formed in a curved shape.

On the other hand, it is also possible to form at least the portion subject to come in contact under pressure with the flexible member among the lateral surfaces of the link portion of the temple arm in a curved shape. FIG. 20 is a perspective view showing an example of construction wherein the lateral surface of the link portion of the temple arm is formed in a curved shape. In this example of construction, the upper surface 11a (and the lower surface 11b) of the link portion 11 of the temple arm 1 is formed in an elliptical shape, and is formed in such a way that, as seen from the above, the center of the ellipse of the upper surface 11a may coincide with the center of the circle of the pivots 12 and 13.

When the link portion 11 of the temple arm 1 is formed in such a way, as may be easily assumed from the description of FIGS. 7 to 10 or FIG. 19, it is possible to make an arrangement to gradually increase the resistance to rotation while the temple arm 1 is folded. And conversely, while the temple arm is deployed, it is possible to make an arrangement to easily or rapidly accelerate the speed of deployment after passing a certain point.

Figure 21:
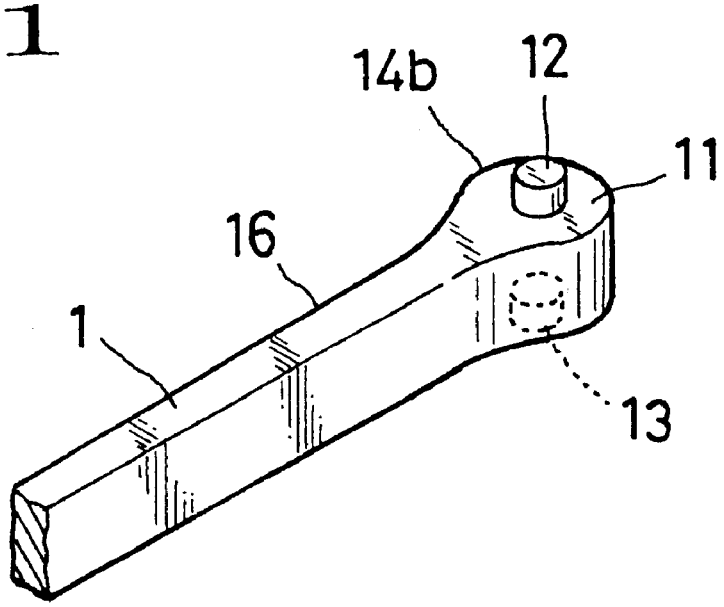
FIG. 21 is a view showing an example of construction of the link portion of a temple arm the lateral surface of which is formed in a cylindrical shape.

And as shown in FIG. 21, it is obviously possible to form the lateral surface of the link portion 11 of the temple arm 1 in a cylindrical shape. In case of formation in such a shape, it is possible to give a characteristic of being subjected constantly to a fixed resistance to rotation to the temple arm 1 when it is deployed or folded.

[Variants in the Construction of Pivots]

So far, the preferred embodiments (see FIG. 2) and various variants of the link structure between a temple arm and a bracket according to this invention have been described. There, the link portion of the temple arm is provided in advance with pivots and the upper and lower link pieces of the bracket are provided respectively with an eyelet for the insertion of pivot and a guide portion.

However, it is obviously possible to separate the link portion of the temple arm and the pivot and to link the temple arm and the upper and lower link pieces of the bracket with a separate pivot (a member serving as pivot). And now, possible variants will be discussed in case where the pivot is separated.

The following is a description of variants only in relation to the preferred embodiment (see FIG. 2). However, the aforementioned observations with regard to the variants in the construction and material of the flexible member (FIGS. 14–17), the variants in the construction of the link piece of the temple arm (FIGS. 18–21), and the formation of the outer surface of the temple arm in an inwardly depressed state (see FIG. 11) all apply to the following descriptions. Therefore, for the sake of convenience, no further explanations will be given on this point.

[In Case Where the Pivot is a Cylindrical Member]

Figure 22:
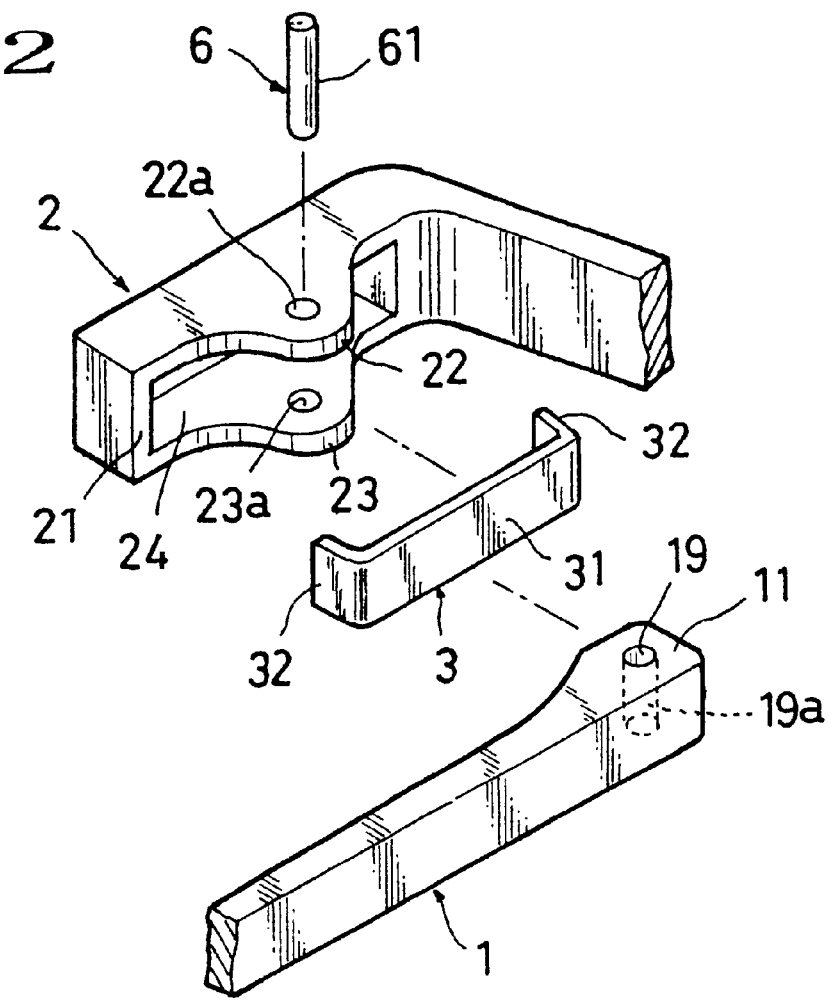
FIG. 22 is an exploded view showing separately the components of the link structure between a temple arm and a bracket.

FIG. 22 is an exploded view showing separately the elements of the link structure between a temple arm and a bracket. In this case, the link structure between a temple arm and a bracket comprises four elements; temple arm 1, bracket 2, flexible member 3 and pivot 6.

The flexible member 3 and the depression 24 of the bracket 2 are similar to those described in the preferred embodiment.

The link portion 11 of the temple arm 1 includes an eyelet for the insertion of a pivot 19 for letting a pivot 6 through. In this case, the eyelet for the insertion of a pivot 19 is formed as a pierced circular hole 19a.

The upper and lower link pieces 22 and 23 of the bracket 2 include no guide portions (22b and 23b), but include only eyelets for the insertion of pivot 22a and 23a for fixing the pivot 6 piercing through the whole link pieces.

In this case, the pivot 6 is formed as a cylindrical member 61.

The following is a description the linkup of these members. In the first place, the flexible member 3 is inserted into the depression 24 of the bracket 2, and the link portion 11 of the temple arm 1 is inserted between the upper and lower link pieces 22 and 23 of the bracket 2. And the central axis of the eyelets for the insertion of pivot 22a and 23a of the upper and lower link pieces 22 and 23 of the bracket 2 and that of the eyelet for the insertion of pivot 19 (i.e. the pierced circular hole 19a) of the link portion 11 of the temple arm 1 are aligned, and the pivot 6 (i.e. the cylindrical member 61) is inserted to pierce through them and to fix rotatably. The upper and lower ends of the pivot 6 are engaged with the eyelets for the insertion of pivot 22a and 23a of the upper and lower link pieces 22 and 23 of the bracket 2 and are fixed solidly in the eyelets for the insertion of pivot linking rotatably the temple arm 1 and the bracket 2.

Such a linkup results, as in the case of the preferred embodiment, in the state of constant contact under pressure between the link portion 11 of the temple arm 1 and the flexible member 3.

[In Case Where the Link Portion of the Temple Arm is Bent]

Figure 23:
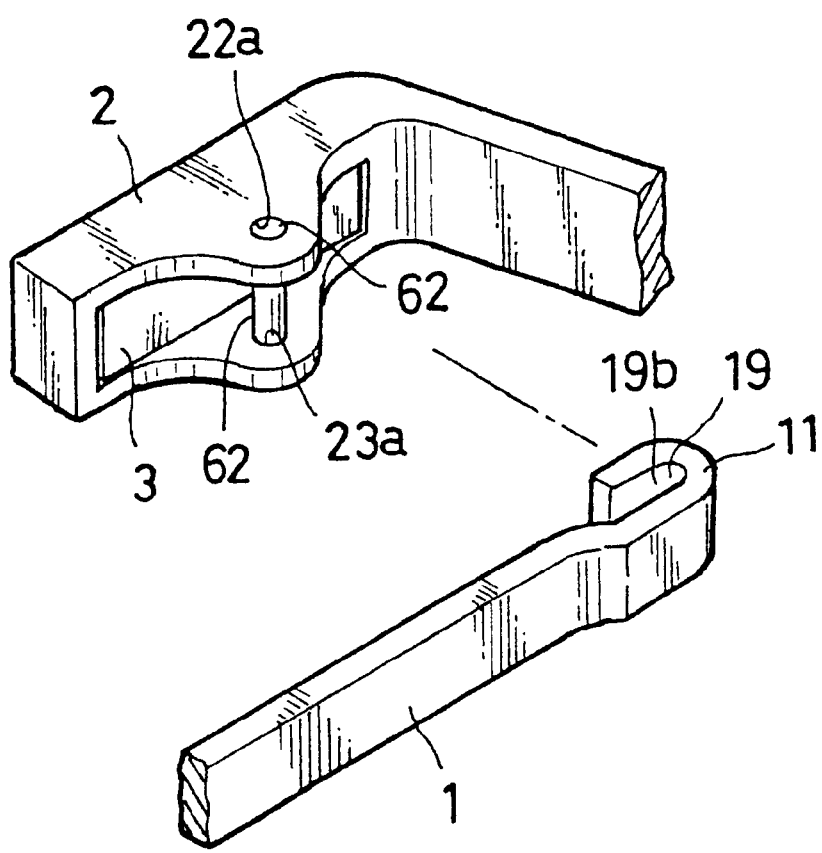
FIG. 23 is a view showing the case wherein the link portion of a temple arm is bent.

When a cylindrical member 61 is used for the pivot 6, it is possible to change the shape of the link portion 11 of the temple arm 1. FIG. 23 is a perspective view showing the case wherein the link portion of the temple arm is bent. In this case, the eyelet for insertion of pivot 19 of the link portion 11 of the temple arm 1 is a depression 19b formed by bending approximately in the U shape the link portion 11 of the temple arm 1.

The temple arm 1 and the bracket 2 may be linked in the same way as the case of the aforementioned example of construction shown in FIG. 22. However, as shown in FIG. 23, after engaging the cylindrical member with and fixing solidly the cylindrical member in the eyelets for the insertion of pivot 22a and 23a of the upper and lower link pieces in advance, the depression 19b of the temple arm 1 may be hooked to be fixed rotatably resulting in a routable linkup between the temple arm 1 and the bracket 2.

[In Case Where the Upper and Lower Link Pieces are Linked by an Integral Pivot]

Figure 24:
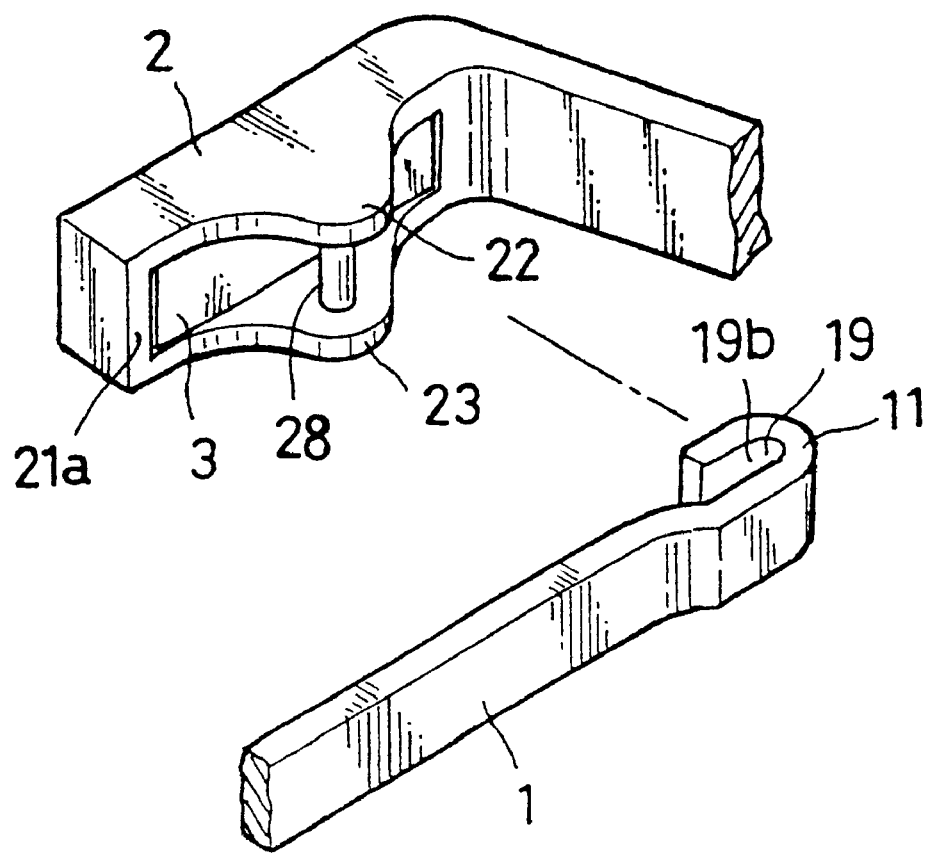
FIG. 24 is a view showing the case wherein a cylindrical member is integrated with the upper and lower link pieces to form a integral pivot.

In the aforementioned example of construction, it is possible to integrate in advance the aforementioned cylindrical member with the upper and lower link pieces of the bracket. FIG. 24 is a perspective view showing the case wherein the cylindrical member is integrated with the upper and lower link pieces to constitute an integral pivot.

In this case, the upper and lower link pieces 22 and 23 of the bracket 2 are linked by the integral pivot 28, and the integral pivot 28 is integrated with the link pieces 22 and 23. The integral pivot 28 functions in the identical way as the aforementioned cylindrical member 61. And the flexible member 3 is engaged through the space between the front end 21a inside the bracket 2 and the integral pivot 28.

[Eyeglasses Comprising the Link Structure Between a Temple Arm and a Bracket According to this Invention]

Figure 25:
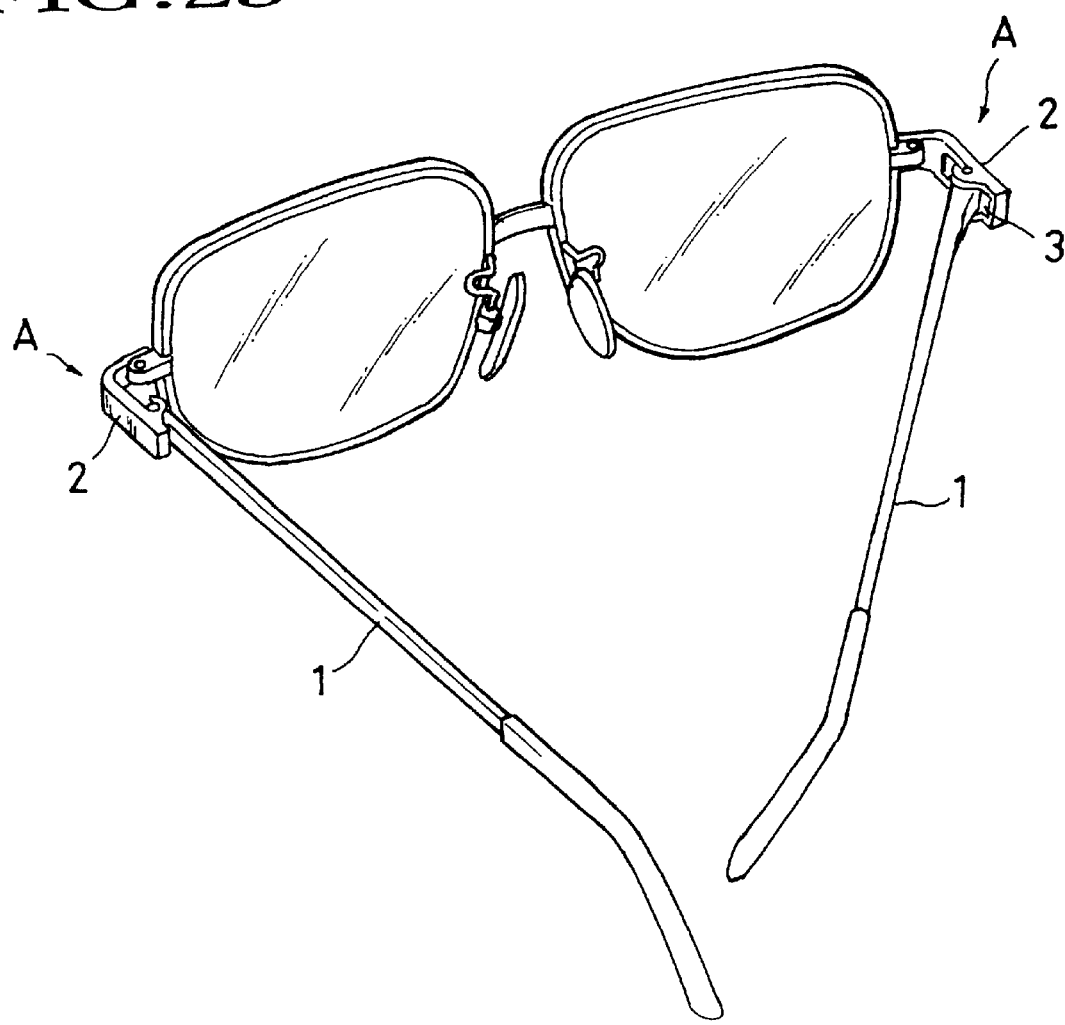
FIG. 25 is a perspective view showing an example of construction of eyeglasses provided with a link structure between a temple arm and a bracket according to this invention.

An example of construction of eyeglasses comprising the link structure between a temple arm and a bracket according to this invention is shown in FIG. 25. One of the most important characteristics of the link structure A between a temple arm and a bracket according to this invention was that it can provide an appropriate resistance to the deployment and folding motion of the temple arm and that it can produce a characteristic variation of deploying and folding motion of the temple arm.

In particular, the characteristic deploying and folding motion of the temple arm can be varied by the shape of the lateral surface of the link portion of the temple arm. This specification shows by way of example various shapes (see FIGS. 3, 18, 20 or 21).

Conversely speaking, by making a large number of temple arms of different shapes of the lateral surface of the link portion and preparing a wide variety of flexible members, the combinations thereof will be more diversified.

In other words, according to this invention, it will be possible to design freely eyeglasses meeting the taste of the customer by choosing and replacing the temples and flexible members.

Referring to the description of this invention that has been made so far, it is needless to say that this invention is not limited to these embodiments, and other various variants are possible provided that they do not depart from the spirit of the invention.

For example, with regard to the preferred embodiment of the link structure between a temple arm and a bracket according to this invention shown in FIG. 1, various variants related to it link pieces, flexible member, the link portion of the temple arm or the construction of pivot, etc. have been described. In order to avoid redundancy, no references have been made on the construction completed by combining such variants. However, it is obviously possible to adopt a such combination, and should be understood as a matter that can be read from this specification.

And it is obviously possible to integrate the flexible member 3 or 3a with the bracket 2 in examples of construction shown in drawings other than FIG. 17. With regard to the flexible member 3 or 3a in particular, it is needless to say that various variants other than the shapes and the manner of fixing to the bracket described in the specification are possible.

Figure 26:
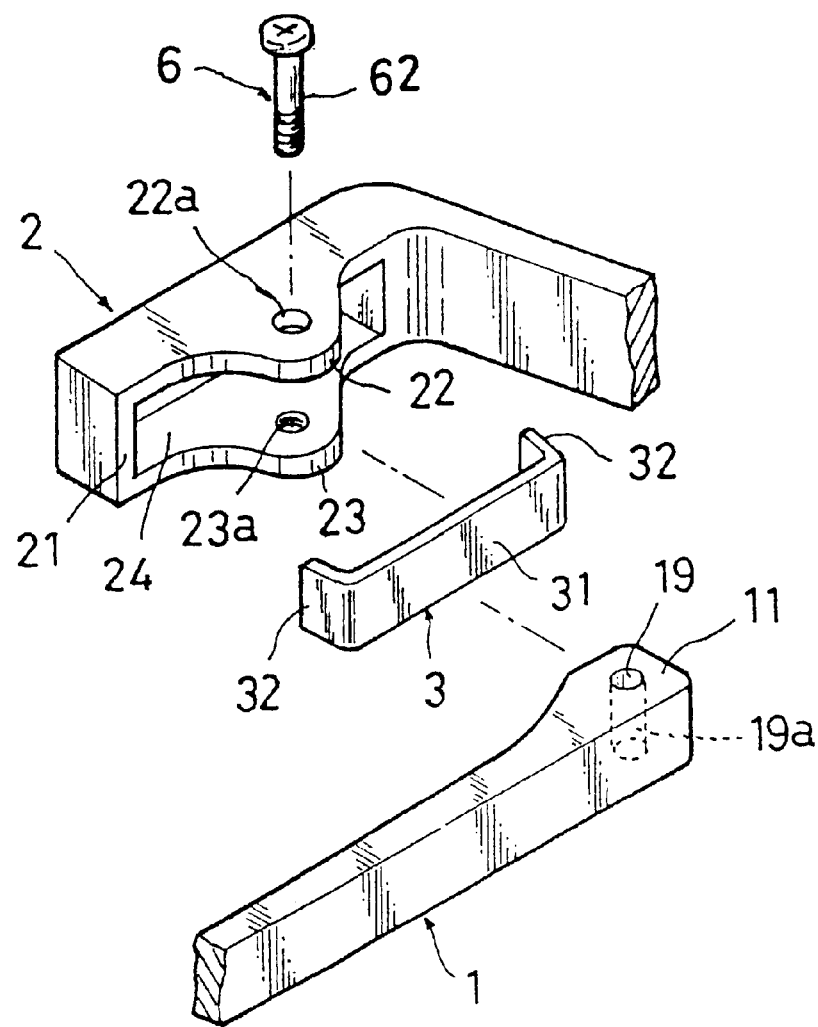
FIG. 26 is an exploded view showing separately the elements of a link structure between a temple arm and a bracket when a screw is employed for the pivot.

And in the variant of the construction of pivot shown in FIG. 22, it is obviously possible to use a screw 62 like in the past examples for the pivot 6 (a cylindrical member 61 in the case of FIG. 22) (see FIG. 26).

Lastly, in this specification the case of creating a depression for engaging a flexible member between the upper and lower link pieces on the inner side of the bracket and engaging the flexible member with the depression was mentioned.

However, it is obviously possible to create such a structure on the link portion of the temple arm and to apply various characteristic structures described in connection with the link portion of the temple arm in this specification to the front end of the bracket.

According to this invention, it is possible to provide an adequate resistance to the deployment and folding motion of the temple arm with the minimum possible number of parts, i.e. the temple arm, the bracket and the flexible member (limited to the temple arm and the bracket if the flexible member and the bracket are integrated) in the link structure between a temple arm and a bracket. And it is also possible to produce a characteristic variation in the deploying and folding motion of the temple arm and give an impression of a high-grade product to eyeglasses by forming the lateral surface of the link portion of the temple arm in various shapes. Further, it is possible to impart a visually simple and esthetic appearance to eyeglasses by leveling the flexible member and the inner surface of the bracket. Finally, eyeglasses comprising the link structure between a temple arm and a bracket according to this invention enable consumers to freely select different types of temple arm and flexible member.

What is claimed is:

1. A link structure between a temple arm and a bracket for eyeglasses wherein
    the temple arm comprises a link portion linking said temple arm with said bracket;
    the bracket comprises link pieces on the inner upper and lower sides of the bracket, and a flexible member between the upper and lower link pieces; and
    the link portion of the temple arm is inserted between the upper and lower link pieces to be fixed rotatably there linking the temple arm and the bracket, and the link portion of the temple arm and the flexible member are kept constantly in contact under pressure.

2. A link structure between a temple arm and a bracket for eyeglasses wherein
    the temple arm comprises a pivot protruding respectively on the upper and lower surfaces of the link portion linking itself with said bracket;
    the bracket comprises link pieces on its inner upper and lower sides and a flexible member between the upper and lower link pieces;
    the upper and lower linking pieces comprise respectively an eyelet for the insertion of a pivot and a guide portion for guiding the pivot of the temple arm into the eyelet for the insertion of pivot; and
    the link portion of the temple arm is inserted between the upper and lower link pieces of the bracket, the pivots on the upper and lower surfaces of the link portion of the temple arm are inserted into the guide portions of the eyelets for the insertion of pivot formed on the upper and lower link pieces of the bracket to be fixed rotatably in the eyelets for the insertion of pivot, the temple arm and the bracket are rotatably linked, and the link portion of the temple arm and the flexible member are constantly in contact under pressure.

3. The link structure between a temple arm and a bracket according to claim 2 wherein, at least one of said eyelets for the insertion of pivot of the upper and lower link pieces of the bracket and their guide portions is pierced.

4. The link structure between a temple arm and a bracket according to claim 2 wherein said eyelets for the insertion of pivot of the upper and lower link pieces of the bracket and their guide portions are both bottomed and hollow.

5. The link structure between a temple arm and a bracket for eyeglasses wherein,
    the temple arm comprises an eyelet for the insertion of a pivot for letting a pivot through in the link portion linking itself with the bracket;
    the bracket comprises link pieces on the inner upper and lower sides and a flexible member between the upper and lower link pieces;
    the upper and lower link pieces comprise respectively an eyelet for the insertion of pivot; and
    the link portion of the temple arm is inserted between the upper and lower link pieces of the bracket, and a pivot is inserted in such a way that the eyelets for the insertion of pivot of the upper and lower link pieces of the bracket and the eyelet for the insertion of pivot of the link portion of the temple arm would be pierced through, is fixed rotatably there, and is fixed solidly in the eyelets for the insertion of pivot of the upper and lower link pieces of the bracket to link rotatably the temple arm and the bracket and thus the link portion of the temple arm and the flexible member are kept constantly in contact under pressure.

6. The link structure between a temple arm and a bracket according to claim 5 wherein said pivot is a screw.

7. The link structure between a temple arm and a bracket according to claim 5 wherein said pivot is a member that can be engaged with the eyelets for the insertion of pivot of the upper and lower link pieces of the bracket.

8. The link structure between a temple arm and a bracket according to claim 5 wherein said eyelet for the insertion of pivot in the link portion of the temple arm is a pierced circular hole.

9. The link structure between a temple arm and a bracket according to claim 5 wherein said eyelet for the insertion of pivot in the link portion of the temple arm is a depression formed by the flexion of the link portion.

10. The link structure between a temple arm and a bracket for eyeglasses wherein,
    the temple arm forms an eyelet for the insertion of pivot by the flexion of its link portion linking itself with the bracket;
    the bracket comprises link pieces on its inner upper and lower sides and a flexible member between the upper and lower link pieces;
    the upper and lower link pieces are linked by an integral pivot;
    the link portion of the temple arm is inserted between the upper and lower link pieces of the bracket, the eyelet for the insertion of pivot of the link portion of the temple arm is hooked on the integral pivot linking the upper and lower link pieces of the bracket to be fixed rotatably therein, the temple arm and the bracket are rotatably linked, and the link portion of the temple arm and the flexible member are kept constantly in contact under pressure.

11. The link structure between a temple arm and a bracket according to claim 2 or 5 or 10 wherein said flexible member is engaged with the depression formed inside between the upper and lower link pieces of the bracket.

12. The link structure between a temple arm and a bracket according to claim 2 or 5 or 10 wherein said flexible member is engaged with the depression with supports formed inside between the upper and lower link pieces of the bracket.

13. The link structure between a temple arm and a bracket according to claim 2 or 5 or 10 wherein said flexible member is integrated with the bracket.

14. The link structure between a temple arm and a bracket according to claim 2 or 5 or 10 wherein at least the portion subject to come into contact under pressure with the flexible member among the lateral surfaces of said link portion of the temple arm is formed by two rectangular surfaces approximately at right angle to each other.

15. The link structure between a temple arm and a bracket according to claim 2 or 5 or 10 wherein at least the portion subject to come into contact under pressure with the flexible member among the lateral surfaces of said link portion of the temple arm is formed by three or more rectangular surfaces.

16. The link structure between a temple arm and a bracket according to claim 2 or 5 or 10 wherein at least the portion subject to come into contact under pressure with the flexible member among the lateral surfaces of said link portion of the temple arm is formed with a curved surface.

17. The link structure between a temple arm and a bracket according to claim 2 or 5 or 10 wherein at least the portion subject to come into contact under pressure with the flexible member among the lateral surfaces of said link portion of the temple arm is formed in a cylindrical shape.

18. The link structure between a temple arm and a bracket according to claim 2 or 5 or 10 wherein the outer surface of the temple arm is formed in a inwardly depressed state.

19. Eyeglasses comprising the link structure between a temple arm and a bracket according to any one of claims 1–18.

* * * * *